United States Patent
Sugisawa et al.

(10) Patent No.: US 11,106,552 B2
(45) Date of Patent: Aug. 31, 2021

(54) DISTRIBUTED PROCESSING METHOD AND DISTRIBUTED PROCESSING SYSTEM PROVIDING CONTINUATION OF NORMAL PROCESSING IF BYZANTINE FAILURE OCCURS

(71) Applicant: Hitachi, Ltd., Tokyo (JP)

(72) Inventors: Tomoaki Sugisawa, Tokyo (JP); Nobuyuki Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 111 days.

(21) Appl. No.: 16/561,063

(22) Filed: Sep. 5, 2019

(65) Prior Publication Data
US 2020/0233761 A1    Jul. 23, 2020

(30) Foreign Application Priority Data
Jan. 18, 2019   (JP) .............................. JP2019-006800

(51) Int. Cl.
*G06F 11/20*   (2006.01)

(52) U.S. Cl.
CPC ...... *G06F 11/2023* (2013.01); *G06F 2201/82* (2013.01)

(58) Field of Classification Search
CPC .. G06F 11/20; G06F 11/2023; G06F 11/2028; G06F 11/2041; G06F 11/2048; G06F 17/30371; G06F 12/00; G06F 17/30312
See application file for complete search history.

(56) References Cited

U.S. PATENT DOCUMENTS

| | | | |
|---|---|---|---|
| 7,334,154 B2 * | 2/2008 | Lorch | G06F 11/182 714/11 |
| 7,555,516 B2 * | 6/2009 | Lamport | G06F 11/1494 709/201 |
| 7,565,433 B1 * | 7/2009 | Lamport | G06Q 10/107 700/2 |
| 7,620,680 B1 * | 11/2009 | Lamport | H04L 63/1441 709/201 |
| 7,865,763 B2 * | 1/2011 | Baba | G06F 11/2097 714/3 |

(Continued)

FOREIGN PATENT DOCUMENTS

JP   2014-178793 A   9/2014
WO   2015/186191 A1  12/2015

*Primary Examiner* — Kamini B Patel
(74) *Attorney, Agent, or Firm* — Mattingly & Malur, PC

(57) ABSTRACT

A distributed processing method to receive data by a plurality of servers each including a processor and a memory, and process the data by replicating, the method includes a first determination step in which the servers each receive the replicated data, and a first determination unit determines a degree of consistency of the received data and an output step in which the servers each receive a determination result of the degree of consistency of the data from the first determination unit, and if the determination result includes data that guarantees consistency, the server outputs the data that guarantees consistency. A first number of servers that are to receive the data is set in advance based on a prescribed allowable number of failures that defines the number of servers that can have failures, and an allowable number of byzantine failures that defines the number of servers that can have byzantine failures.

16 Claims, 18 Drawing Sheets

(56) References Cited

U.S. PATENT DOCUMENTS

| | | | | |
|---|---|---|---|---|
| 8,005,888 B2* | 8/2011 | Lamport | ............... | G06F 9/542 |
| | | | | 709/201 |
| 8,549,180 B2* | 10/2013 | Critchley | ............ | H04L 61/1511 |
| | | | | 709/251 |
| 2005/0089131 A1* | 4/2005 | Howell | ............... | G06F 21/725 |
| | | | | 377/1 |
| 2009/0240974 A1* | 9/2009 | Baba | ............... | G06F 11/2041 |
| | | | | 714/4.1 |
| 2010/0262717 A1* | 10/2010 | Critchley | ............ | H04L 61/1541 |
| | | | | 709/251 |
| 2011/0004521 A1* | 1/2011 | Behroozi | ............... | G06F 7/24 |
| | | | | 705/14.54 |
| 2017/0004029 A1* | 1/2017 | Endo | ............... | G06F 11/0709 |
| 2017/0011086 A1* | 1/2017 | Fukunaka | ............... | G06F 12/00 |

\* cited by examiner

300 PRIORITY TABLE (2-STEP UNIT QUORUM COMPARISON USING NORMAL VALUE)

| PRIORITIES | CHARACTERISTICS |
|---|---|
| 1 | DECISION VALUE OF PROCESS-SAVING 1-STEP ALGORITHM OR 2-STEP ALGORITHM (COMPLETE MATCH WITHIN DECISION QUORUM ($n_1$-$q$) FOR PROCESS-SAVING 1-STEP, AND COMPLETE MATCH WITHIN COUNTING QUORUM ($n_{22}$-$f_{22}$) FOR 2-STEP) |
| 2 | VALUE WITH MATCHES OF THE SAME NUMBER AS $b_{22}$+ 1 WITHIN COUNTING QUORUM ($n_{22}$-$f_{22}$) OF 2-STEP ALGORITHM |
| 3 | VALUE WITH MAJORITY MATCH WITHIN ESTIMATION QUORUM ($n_1$-$f_1 \geq Q_i \geq 2q+2b_1+1$) OF PROCESS-SAVING 1-STEP ALGORITHM |
| 4 | COMBINATION EMPTY. HOWEVER, IF THERE IS VALUE THAT IS ARBITRARY VALUE OF PROCESS-SAVING 1-STEP ALGORITHM OR 2-STEP ALGORITHM AND THAT COINCIDES WITH NORMAL VALUE TABLE, THAT VALUE NEEDS TO BE OUTPUT. |

FIG.4

300A PRIORITY TABLE (2-STEP UNIT QUORUM COMPARISON USING MOST FREQUENT VALUE)

| PRIORITIES | CHARACTERISTICS |
|---|---|
| 1 | DECISION VALUE OF PROCESS-SAVING 1-STEP ALGORITHM OR 2-STEP ALGORITHM (COMPLETE MATCH WITHIN DECISION QUORUM ($n_1$-$q$) FOR PROCESS-SAVING 1-STEP, AND COMPLETE MATCH WITHIN COUNTING QUORUM ($n_{22}$-$f_{22}$) FOR 2-STEP) |
| 2 | VALUE WITH MATCHES OF THE SAME NUMBER AS $b_{22}$+1 WITHIN COUNTING QUORUM ($n_{22}$-$f_{22}$) OF 2-STEP ALGORITHM |
| 3 | VALUE WITH MAJORITY MATCH WITHIN ESTIMATION QUORUM ($n_1$-$f_1 \geq Q_i \geq 2q+2b_1+1$) OF PROCESS-SAVING 1-STEP ALGORITHM |
| 4 | COMBINATION EMPTY. HOWEVER, IF THERE IS VALUE THAT IS ARBITRARY VALUE OF PROCESS-SAVING 1-STEP ALGORITHM OR 2-STEP ALGORITHM AND THAT COINCIDES WITH MOST FREQUENT VALUE TABLE, THAT VALUE NEEDS TO BE OUTPUT. |

FIG.5

330 NORMAL VALUE TABLE

| 331 PROCESS NUMBER | 332 DATA | 333 NUMBER OF MATCHES |
|---|---|---|
| 100 | V | 5 |
| 101 | V | 5 |
| 101 | W | 2 |
| - | - | - |

FIG.6

340 MOST FREQUENT VALUE TABLE

| 341 PROCESS NUMBER | 342 DATA | 343 NUMBER OF MATCHES |
|---|---|---|
| 101 | V | 5 |
| - | - | - |

FIG.7

EXAMPLE IN WHICH $n_{21}=8$, $f_{21}=3$, $b_{21}=1$,
AND THE SIZE OF SELECTION QUORUM IS 5

EXAMPLE IN WHICH $n_{22}=9$, $f_{22}=3$, $b_{22}=1$,
AND THE SIZE OF COUNTING QUORUM IS 6

DISTRIBUTED PROCESSING METHOD AND DISTRIBUTED PROCESSING SYSTEM PROVIDING CONTINUATION OF NORMAL PROCESSING IF BYZANTINE FAILURE OCCURS

CLAIM OF PRIORITY

The present application claims priority from Japanese patent application JP 2019-6800 filed on Jan. 18, 2019, the content of which is hereby incorporated by reference into this application.

BACKGROUND

The present invention relates to a distributed processing system configured to store data in a plurality of servers and replicate the data to ensure availability.

In a distributed processing system such as distributed in-memory key value store (KVS), in order to prevent data from being lost when a failure occurs in a server, the data is stored in a plurality of servers in a distributed manner to ensure availability.

A method using the distributed consensus algorithm is known to guarantee the data consistency in the replication where data is stored in a plurality of servers. Known examples of the distributed consensus algorithm include the PAXOS algorithm.

In the distributed processing system, a method to increase the number of required processes using the PAXOS algorithm is known to realize a low latency while guaranteeing the data consistency. Although this method makes it possible to reach a consensus with a smaller number of times of communications, the number of processes increases and the allowable number of failures that can maintain the minimum number of times of communications is reduced.

On the other hand, WO2015/186191 (Patent Document 1) is known as a technology to reduce the number of times of communications before the data consistency is guaranteed after the data update (or reference) request is transmitted to the server, while suppressing an increase in the number of servers (or number of processes).

SUMMARY

However, although Patent Document 1 takes a server failure into consideration, the case when a byzantine failure occurs in a server as disclosed in Japanese Patent Application Laid-open Publication No. 2014-178793 was not discussed.

Byzantine failures are failures including invalid processing or device shutdown due to soft errors on devices such as FPGA (field programmable gate array), software bugs, hardware failures, and intrusions to devices Patent Document 1 described above can work around the impact of device failures, but if there is a device that performs invalid processing due to the byzantine failures, the impact thereof cannot be avoided. In the configuration of Patent Document 1, a part affected by the byzantine failure differs depending on the location where the byzantine failure occurs, and if such a failure occurs in the consensus processing unit, the distributed consensus process would not be performed properly. If such a failure occurs in the data storage unit, a request would not be processed properly.

The present invention was made in view of the above-mentioned problems, and an object thereof is to continue a proper process even when a byzantine failure occurs, while suppressing an increase in the number of servers (process number) and reducing the number of times of communications before the data consistency is guaranteed.

A distributed processing method to receive data by a plurality of servers each including a processor and a memory, and process the data by replicating, the method includes a first determination step in which the servers each receive the replicated data, and a first determination unit determines a degree of consistency of the received data and an output step in which the servers each receive a determination result of the degree of consistency of the data from the first determination unit, and if the determination result includes data that guarantees consistency, the server outputs the data that guarantees consistency. A first number of servers that are to receive the data is set in advance based on a prescribed allowable number of failures that defines the number of servers that can have failures, and an allowable number of byzantine failures that defines the number of servers that can have byzantine failures.

According to the present invention, even if a byzantine failure occurs, it is possible to continue a normal process without detecting or correcting such a failure, while suppressing an increase in the number of servers (process number) and reducing the number of times of communications before the data consistency is guaranteed.

BRIEF DESCRIPTION OF THE DRAWINGS

FIG. 4 is a diagram illustrating an example of a priority table 300 used by the combination according to the first embodiment of this invention.

FIG. 5 is a diagram illustrating an example of a priority table 300A used by the combination unit according to the first embodiment of this invention.

FIG. 6 is a diagram illustrating an example of a normal value table used by the normal value selection unit according to the first embodiment of this invention.

FIG. 7 is a diagram illustrating an example of a most frequent value table according to the first embodiment of this invention.

DETAILED DESCRIPTION OF THE EMBODIMENTS

Below, embodiments of the present invention will be explained with reference to the appended figures.

Embodiment 1

Figure 1:
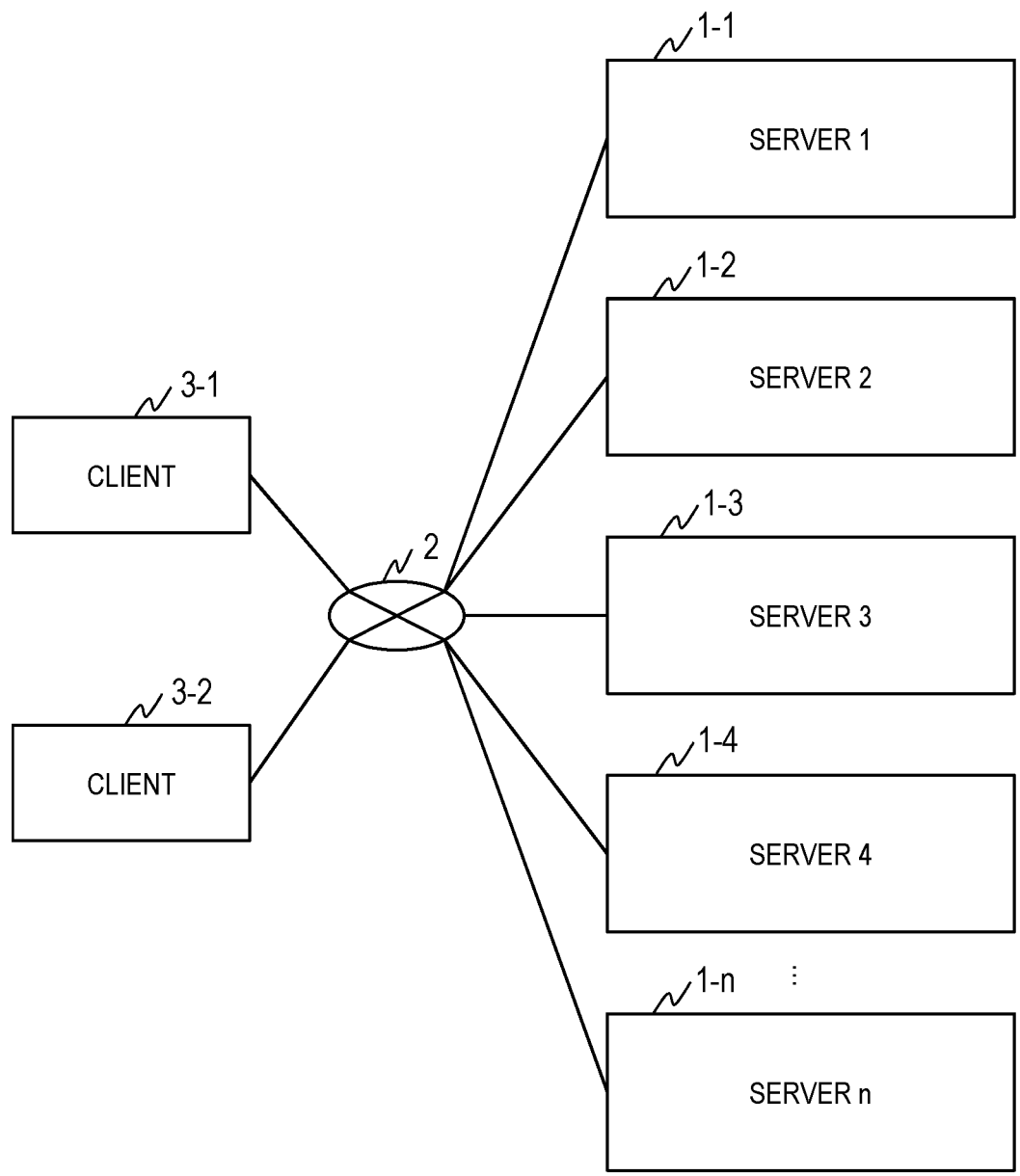
FIG. 1 is a block diagram illustrating an example of a distributed processing system configured to conduct a distributed process according to a first embodiment of this invention.

FIG. 1 is a block diagram illustrating an example of a distributed processing system configured to conduct a distributed process. Servers 1-1 to 1-$n$ are connected to clients 3-1 and 3-2 via a network 2. The servers 1-1 to 1-$n$ form a distributed processing system for processing data received from the clients 3-1 and 3-2 in a distributed manner. In the following description, the servers 1-1 to 1-$n$ are collectively represented by the reference number 1 omitting a character after the hyphen, and the clients 3-1 and 3-2 are collectively represented by the reference number 3 omitting a character after the hyphen.

Figure 2:
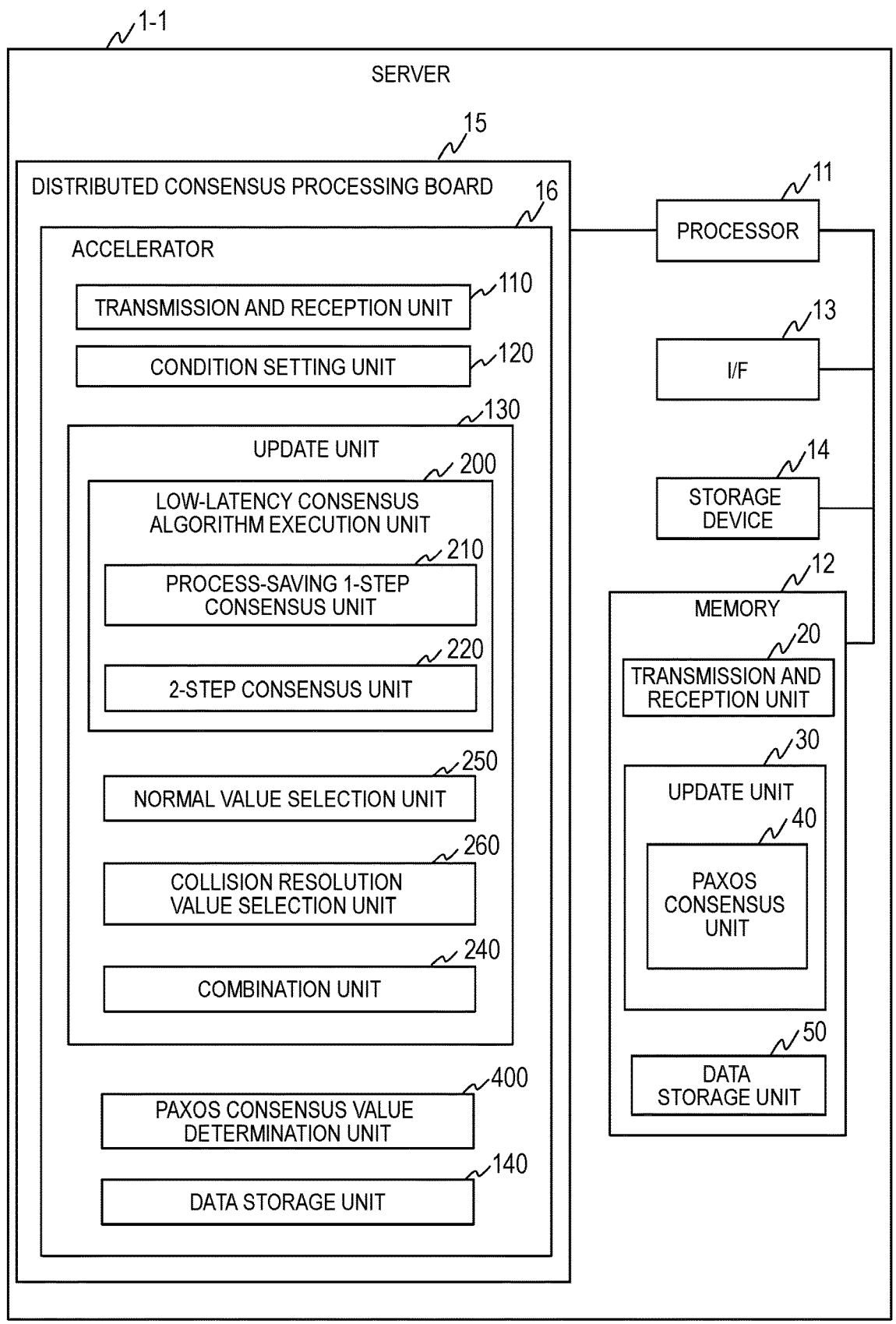
FIG. 2 is a block diagram illustrating an example of the configuration of the server according to the first embodiment of this invention.

FIG. 2 is a block diagram illustrating an example of the configuration of the server 1-1. The servers 1-2 to 1-$n$ have the same configuration, and hence an overlapping description is omitted. The server 1-1 is a computer including a processor 11 configured to conduct calculation, a memory 12 configured to hold a program and data, a storage device 14 configured to store data and a program, an interface 13 connected to the network 2 and configured to conduct communications, and a distributed consensus processing board 15 that has an accelerator 16 configured to conduct a prescribed computing process.

Examples of the accelerator 16 include hardware such as an application specific integrated circuit (ASIC), a field programmable gate array (FPGA), or a general-purpose graphics processing unit (GPGPU).

It is known that a configuration with FPGA is prone to have a byzantine failure due to soft errors, and Embodiment 1 is intended to avoid a byzantine failure of a device (server) having the accelerator 16.

In Embodiment 1, byzantine failures are failures including invalid processing or device shutdown due to soft errors, software bugs, hardware failures, and intrusions or attacks to devices.

The memory 12 holds a transmission and reception unit 20 configured to transmit and receive data through the interface 13, an update unit 30 configured to determine a degree of consistency (identity) between the received data and data of other servers 1, and a data storage unit 50 configured to store data output by the update unit 30. The data storage unit 50 may be set in the storage device 14, or may be set in both the storage device 14 and the memory 12.

The update unit 30 includes a PAXOS consensus unit 40 configured to execute the PAXOS algorithm as an auxiliary consensus algorithm.

The respective function units of the transmission and reception unit 20 and the PAXOS consensus unit 40 constituting the update unit 30 are loaded into the memory 12 as programs. The transmission and reception unit 20 is mainly used when the PAXOS consensus unit 40 tries to reach a consensus with the other servers 1.

The processor 11 conducts processes in accordance with the programs of the respective function units, thereby operating as a function unit providing a prescribed function. For example, the processor 11 functions as the transmission and reception unit 20 by conducting processes in accordance with the transmission and reception program, and functions as the PAXOS consensus unit 40 by conducting processes in accordance with the PAXOS consensus program. The same applies to other programs. Furthermore, the processor 11 operates as a function unit that provides each of the plurality of functions executed by each program. The computer and the computer system are a device and system including those function units.

Information such as programs and tables for realizing the respective functions of the server 1-1 can be stored in the storage device 14, a storage device such as a non-volatile semiconductor memory, a hard disk drive, a solid state drive (SSD), or a computer readable non-temporary data storage medium such as an IC card, SD card, or DVD.

The distributed consensus processing board 15 is equipped with the accelerator 16 configured to conduct the distributed consensus process and execute a received request in the update unit 130. The accelerator 16 includes a transmission and reception unit 110 configured to communicate with other servers 1 via the interface 13, a condition setting unit 120 configured to set conditions of a prescribed process, an update unit 130 configured to conduct a distributed consensus process with other servers 1, a PAXOS consensus value determination unit 400 configured to determine the consensus value of the PAXOS consensus unit 40, and a data storage unit 140 that stores results of conducting a prescribed process in response to a request from the client 3 and the like.

Figure 3A:
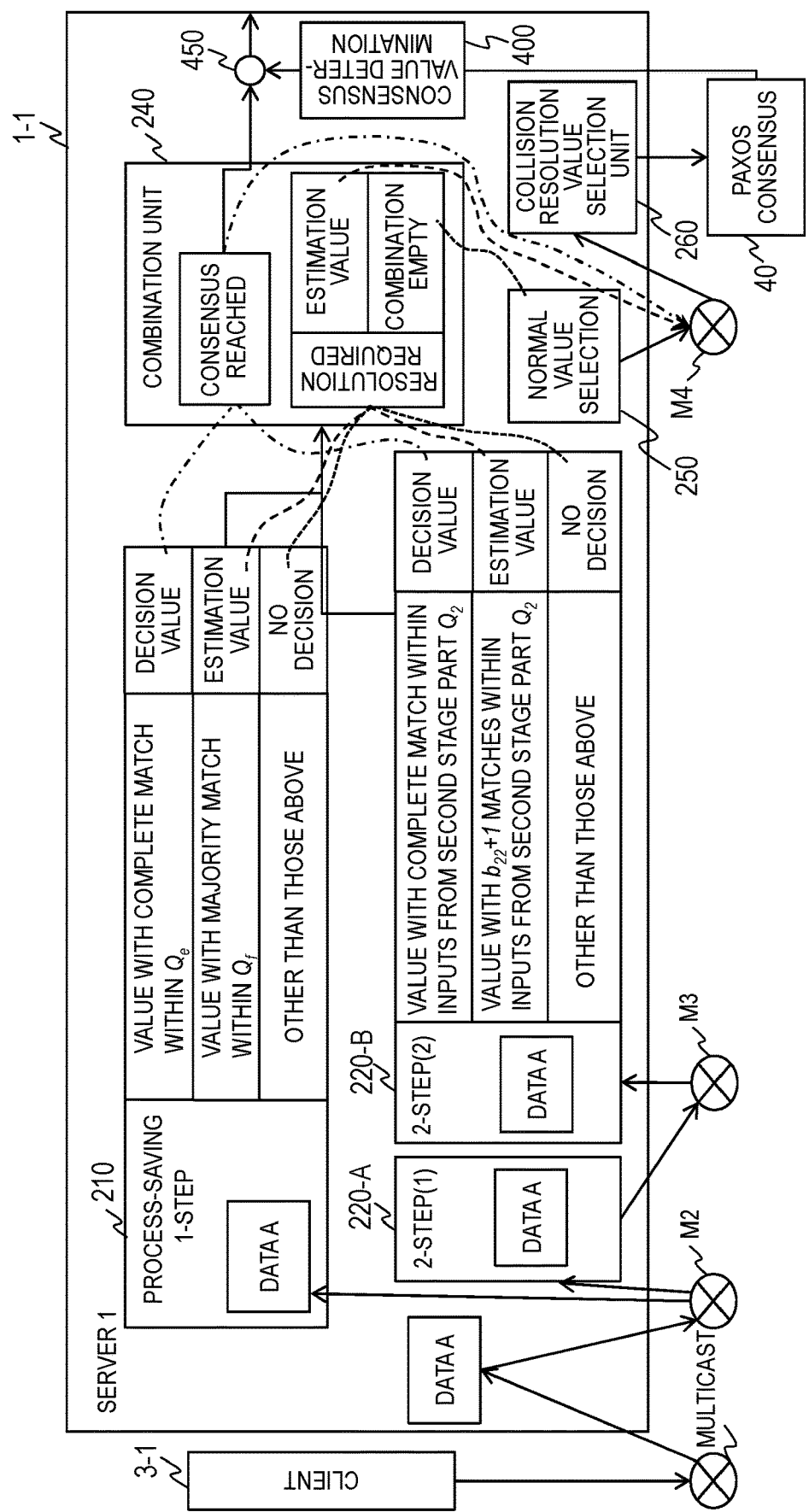
FIG. 3A is a former half of block diagram illustrating an example of the distributed process according to the first embodiment of this invention.
Figure 3B:
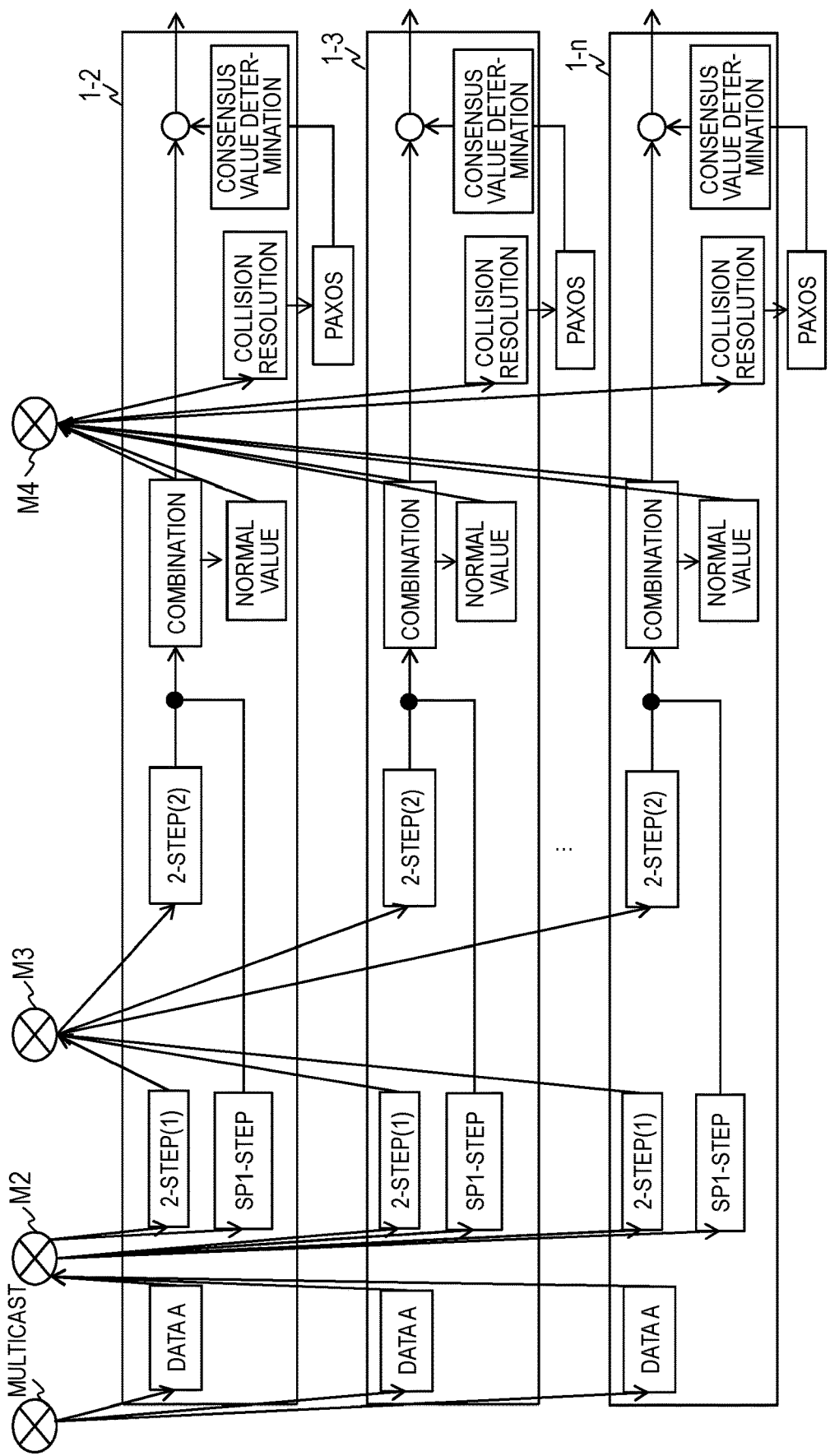
FIG. 3B is a latter half of block diagram illustrating an example of the distributed process according to the first embodiment of this invention.

The update unit 130 includes a low latency consensus algorithm execution unit 200, a normal value selection unit 250, a collision resolution value selection unit 260, and a combination unit 240. In order to determine the degree of consistency between the request (or data) received by the server 1 and the requests of the other servers 1, the low latency consensus algorithm execution unit 200 includes a process-saving 1-step consensus unit 210 configured to execute a process-saving 1-step consensus algorithm, and a 2-step consensus unit 220 configured to execute a 2-step consensus algorithm. As shown in FIG. 3A and FIG. 3B, the 2-step consensus unit 220 is comprised of a first stage part 220-A and a second stage part 220-B, and is collectively represented by the reference number 220.

When receiving a processing request from the client 3, the transmission and reception unit 110 transmits the request received by the server 1-1 to other servers 1-2 to 1-n. After that, the transmission and reception unit 110 receives requests transmitted from all the servers 1-2 to 1-n, and transmits the received requests to the update unit 130, and the update unit 130 determines the degree of consistency of the requests.

The update unit 130 then outputs the request guaranteed to have the consistency with the requests of other servers 1, conducts a process corresponding to such a request, and writes the processing result in the data storage unit 140. When completing the writing, the update unit 130 transmits the processing result to the client 3, and ends the process.

The client 3 is a computer including a processor, a memory, an interface and a storage device, which are not illustrated in the figure. The client 3 is configured to execute an application that requests the server 1 to register data, update data, and refer to data.

Next, the configuration of the update unit 130 will be explained below. As described above, a request received by the transmission and reception unit 110 from the client 3, and requests received by other servers 1 from the client 3 are input into the update unit 130.

The update unit 130 inputs those requests to each of the process-saving 1-step consensus unit 210 (first determination unit) and the 2-step consensus unit 220 (second determination unit), and executes determination of the degree of the consistency (or identity) of the requests.

The process-saving 1-step consensus unit 210 outputs a decision value, an estimation value, or "not decided" as a determination result of the degree of the consistency. In order to address byzantine failures, if the number of matches in the requests received from all of the servers 1 is less than the majority, the process-saving 1-step consensus unit 210 of Embodiment 1 of the present invention outputs "not decided," and notifies the combination unit 240.

The 2-step consensus unit 220 outputs the decision value, estimation value, or "not decided" as a determination result of the degree of the consistency. In order to address byzantine failures, if the number of matches in the requests received from all of the servers 1 does not exceed a prescribed value, the 2-step consensus unit 220 of Embodiment 1 of the present invention outputs "not decided," and notifies the combination unit 240.

The combination unit 240 takes in the decision value, estimation value, or "not decided". When determining that the request received from the client 3 is the same as the requests from the client 3 transmitted to the other servers 1, the combination unit 240 conducts a prescribed process on the input request as a decision value (consensus value) guaranteed to have the consistency, and stores the processing result in the data storage unit 140.

The decision value is data guaranteed to have the consistency (or identity). The consensus value is data having a consensus obtained with the other servers 1 in terms of consistency, and is guaranteed to have the consistency between the servers 1. On the other hand, if a decision value or estimation value is not obtained, the combination unit 240 outputs "combination empty" as an arbitrary value to prevent an abnormal value due to a byzantine failure from being output as described below.

The normal value selection unit 250 collects the requests (or data) that were transmitted from the transmission and reception units 110 and received by the process-saving 1-step consensus unit 210 or the first stage part 220-A of the 2-step consensus unit 220 for the determination of the degree of consistency, and if the number of matches is greater than a prescribed value (allowable number of byzantine failures), the value is deemed normal, and is output to the normal value table 330.

The collision resolution value selection unit 260 collects the decision value, the estimation value, the combination empty value and the normal value from the combination unit 240 of the accelerator 16 of each server 1, and requests the PAXOS consensus unit 40 of the server 1 to reach a consensus with the PAXOS algorithm with a value (collision resolution value) having the number of matches greater than a prescribed value (allowable number of byzantine failures) b4.

When a consensus is reached as a result of the PAXOS consensus unit 40 executing the PAXOS algorithm, the PAXOS consensus value determination unit 400 inputs the consensus value to the data storage unit 140 via the output unit 450 (see FIG. 3A and FIG. 3B), and returns the processing result to the client 3. On the other hand, when the response (consensus value) from the PAXOS consensus unit 40 is empty, the PAXOS consensus value determination unit 400 sends to the client 3 a notification that no consensus was obtained.

In Embodiment 1 of the present invention, the process-saving 1-step consensus unit 210, the 2-step consensus unit 220, the combination unit 240, the normal value selection unit 250, the collision resolution value selection unit 260, and the PAXOS consensus value determination unit 400 were realized by hardware processing by the accelerator 16, and the PAXOS consensus unit 40 as an auxiliary consensus unit was realized by software processing, but the present invention is not limited to this example. For example, some of the units such as the collision resolution value selection unit 260 may be realized by software processing.

<Tables>

Next, the tables used for the distributed process will be explained. In the description below, the tables are held in the accelerator 16, but the present invention is not limited to this. Each table may alternatively be loaded to the memory 12 and the like, and held therein, for example. If the tables are held in the accelerator 16, a device that is not affected by a byzantine failure such as soft error may also be used. When the FPGA is used for the accelerator 16, a unit that stores therein each table may be configured by a compact logical resource of the FPGA, a small amount of register, a block RAM where soft error is automatically corrected by ECC (error correction code), and the like, for example.

FIG. 4 is a diagram illustrating an example of a priority table 300 used by the combination unit 240. The combination unit 240 combines the value of the process-saving 1-step consensus unit 210 and the value of the 2-step consensus unit 220 in accordance with the priorities 301 of the priority table 300. The example of FIG. 4 illustrates a case in which an output from the normal value selection unit 250 is used.

In this example, when the priority is 1, the decision value of the process-saving 1-step consensus unit 210 or the decision value of the 2-step consensus unit 220 is output, when the priority is 2, the estimation value of the 2-step consensus unit 220 is output, and when the priority is 3, the estimation value of the process-saving 1-step consensus unit 210 is output. The priority table 300 of FIG. 4 is held by the condition setting unit 120.

FIG. 5 is a diagram illustrating an example of a priority table 300A used by the combination unit 240. The example of FIG. 5 illustrates a case in which a most frequent value table that stores therein values with the greatest number of matches among the outputs of the normal value selection unit 250 is used. The priority table 300A is configured in a manner similar to the priority table 300 of FIG. 4.

FIG. 6 is a diagram illustrating an example of a normal value table 330 used by the normal value selection unit 250. In the normal value table 330, one entry is comprised of a process number 331, data 332, and the number of matches 333.

The process number 331 is a value assigned by the transmission and reception unit 110. The data 332 has stored therein a value determined by the normal value selection unit 250. The number of matches 333 has stored therein the number of matches between the data 332 and the data from other servers 1. The normal value table 330 is held in the normal value selection unit 250.

FIG. 7 is a diagram illustrating an example of a most frequent value table 340 used by the normal value selection unit 250. In the most frequent value table 340, one entry is comprised of a process number 341, data 342, and the number of matches 343.

The process number 341 is a value assigned by the transmission and reception unit 110. The data 342 has stored therein a value determined by the normal value selection unit 250. The number of matches 343 has stored therein the number of matches between the data 342 and the data from other servers 1. The most frequent value table (not shown in the figure) is a table to hold the most frequent values (normal values), and is held in the normal value selection unit 250.

<Process-Saving 1-Step Consensus Unit>

Figure 17:
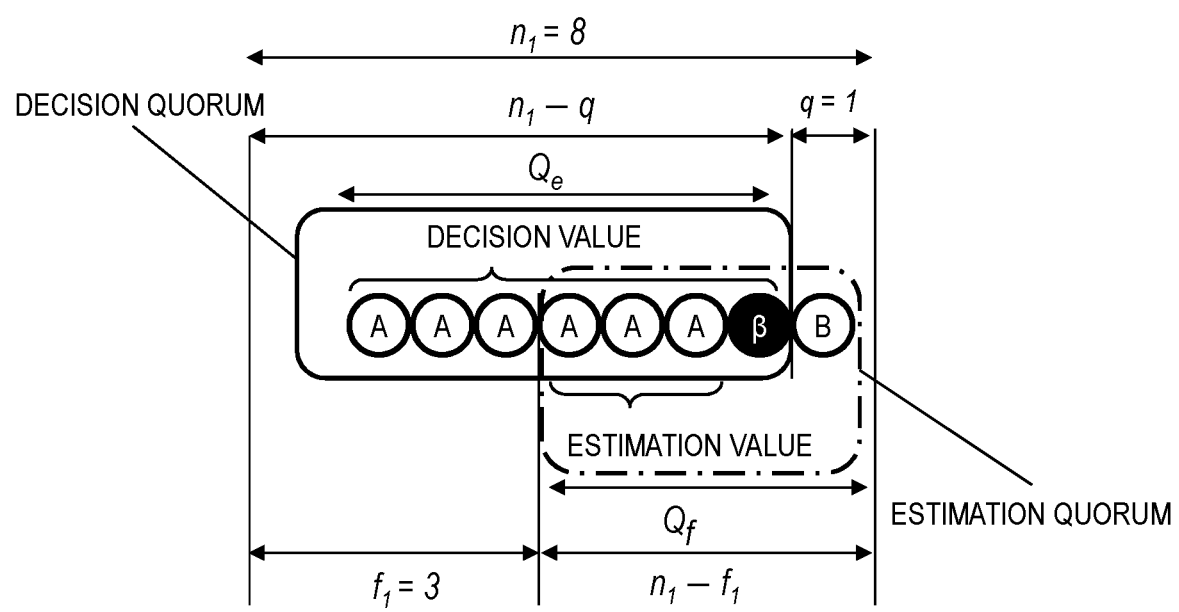
FIG. 17 is a diagram illustrating an example of the quorum of the process-saving 1-step consensus unit according to the first embodiment of this invention.

FIG. 17 is a diagram illustrating an example of the quorum of the process-saving 1-step consensus unit 210. The determination of the degree of the consistency (identity) of data by the process-saving 1-step consensus algorithm, and a resolution method for a case where the consistency is not guaranteed (hereinafter referred to as "collision") are as follows:

Consistency of data: decision values always match;

Resolution of collision: when a decision value is likely to exist in any one of the servers 1, an estimation value always matches the decision value. (When a decision value is likely to exist in any one of the servers 1, an estimation value matching the decision value always exists, and becomes a resolution value (estimation value)).

Otherwise, the result is "not decided."

FIG. 17 illustrates an example where each transmission and reception unit 110 of the servers 1 of FIG. 1 receives data "A," data "B," and data "β," which is caused by a byzantine failure.

The process-saving 1-step consensus unit 210 configured to execute the process-saving 1-step consensus algorithm divides the data received from the transmission and reception unit 110 into two quorums of a decision quorum and an estimation quorum, and obtains the degrees of consistency of the data within the respective quorums by consensuses between the respective servers 1. The quorum represents a partial set of elements involved in execution of distributed processing.

The number of transmission and reception units 110 (servers 1) that comprise the decision quorum is represented by Qe, the number of transmission and reception units 110 (servers 1) that comprise the estimation quorum is represented by Qf, and the total number (process number) of the transmission and reception units 110 (servers 1) is represented by n1.

In the process-saving 1-step consensus unit 210, if the allowable number of failures that can maintain the minimum latency is q, the number of transmission and reception units 110 having a byzantine failure (allowable number of byzantine failures) is b1, and the allowable number of failures that allows for the operation of the process-saving 1-step consensus algorithm is f1, the number of processes n1 required for the process-saving 1-step consensus algorithm needs to satisfy $n1 > 2q + f1 + 2b1$.

The allowable number of shutdowns allowed for the process-saving 1-step consensus is defined by $f1 - b1$. The allowable number of shutdowns represents the number of servers allowed to shut down due to a failure when a b1 number of servers 1 have a byzantine failure.

The allowable number of failures q that can maintain the minimum latency is a parameter relevant to the size of the decision quorum Qe. In Embodiment 1, an example in which $f1=3$, $b1=1$, $q=1$, and $n1=8$ is explained.

When the decision quorum Qe is represented by the parameters, $Qe = n1 - q$ needs to be satisfied. On the other hand, the size of the estimation quorum Qf needs to satisfy $n1 - f1 \geq Qf \geq 2q + 2b1 + 1$.

The size of each quorum is determined based on the requirements of the degree of identity (consistency) of data. FIG. 17 illustrates an example in which the data identity is maintained by those conditions.

When a decision value exists in the decision quorum Qe, the same value as the decision value can always be obtained as an estimation value in the estimation quorum Qf. In the following example, even when the abnormal value β caused by a byzantine failure matches with the request B that is normal but cannot be an estimation value, the estimation value A can be calculated properly. In the determination of the estimation value, a value that matches with at least a majority part within the estimation quorum Qf is the estimated value.

Next, determination processes of the decision value and estimation value in the process-saving 1-step consensus unit 210 will be explained.

(1) Determination of Decision Value

In the determination of a decision value, when all values match, the matched value is the decision value.

(2) Determination of Estimation Value

In the determination of the estimation value, a value that matches with at least a majority part within the estimation quorum Qf is an estimated value.

As described above, by the determination process using quorums, even if a byzantine failure occurs in a b1 number of devices (servers 1), the process-saving 1-step consensus unit 210 can select a normal request as output.

The process-saving 1-step consensus unit 210 keeps receiving data from the transmission and reception units 110 until either one of the following conditions is met.

(Condition 1) Among the inputs received, the values from a Qe (n1−q) number of transmission and reception units 110 match.

(Condition 2) Data is received from all of the transmission and reception units 110 (other servers 1).

(Condition 3) A prescribed period of time has passed.

It is the best if the determination of Condition 1 is made every time when new data is input from the transmission and reception unit 110, but the present invention is not limited to this. The determination may be made at other timings such as when a predetermined number of pieces of data have arrived and every time when new data has arrived thereafter, for example. The prescribed period of time may be a given time-out period defined by a definition file and the like, or a dynamic time-out period automatically calculated from the active statistic information.

As described above, the process-saving 1-step consensus unit 210 is configured to determine the decision value and the estimation value in a state when the number of processes n1 satisfies $n1>2q+f1+2b1$, the decision quorum Qe satisfies $Qe=n1-q$, and the estimation quorum Qf satisfies $n1-f1 \geq Qf \geq 2q+2b1+1$. This way, even if a byzantine failure occurs in a b1 number of devices (servers 1), the process-saving 1-step consensus unit 210 can obtain a decision value and estimation value properly.

<2-Step Consensus Unit>

Figure 18:
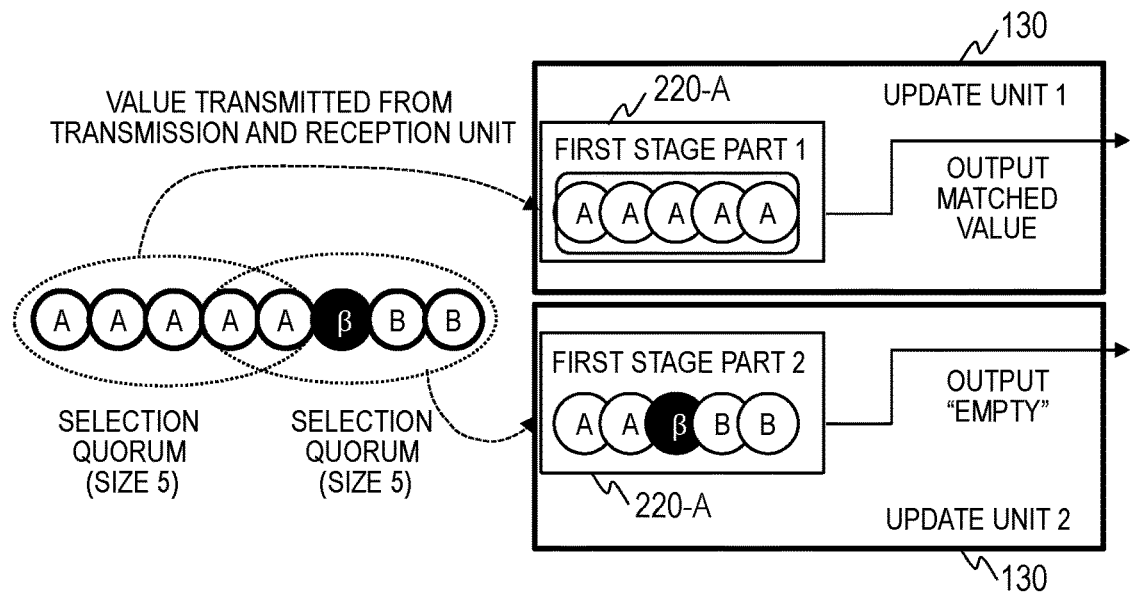
FIG. 18 is a diagram illustrating an example of the first stage part of the 2-step consensus unit and the selection quorum according to the first embodiment of this invention.
Figure 19:
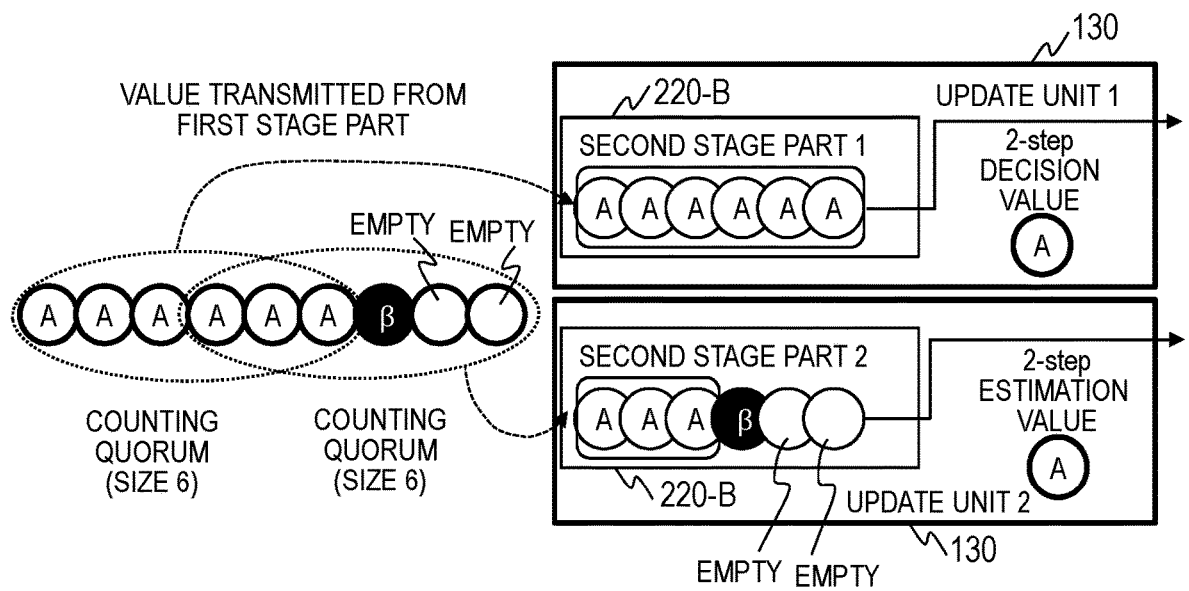
FIG. 19 is a diagram illustrating an example of the second stage part of the 2-step consensus unit and the counting quorum according to the first embodiment of this invention.

FIGS. 18 and 19 are block diagrams illustrating an example of the 2-step consensus unit 220. FIG. 18 is a diagram illustrating an example of the first stage part 220-A of the 2-step consensus unit 220 and the selection quorum. FIG. 19 is a diagram illustrating an example of the second stage part 220-B of the 2-step consensus unit 220 and the counting quorum. In FIGS. 18 and 19, the update units 130 of the servers 1-1 and 1-2 of FIG. 1 are represented by the update units 1 and 2, the first stage part 220-A is represented by the first stage parts 1 and 2, and the second stage part 220-B is represented by the second stage parts 1 and 2. Also, the total number (number of processes) of the 2-step consensus units 220 (servers 1) is set to n2.

FIG. 18 illustrates an example in which the size of the selection quorum received by the first stage unit 220-A is 5. In this example, the first stage part 1 receives five requests A, and the second stage part 2 receives two request A, two requests B, and one abnormal value β caused by a byzantine failure of the transmission and reception unit 110.

In the 2-step consensus unit 220, the selection quorum and the counting quorum are set based on the assumption that the number of byzantine failures occurring in the 2-step consensus unit 220 (allowable number of byzantine failures) is b2, and the allowable number of failures for the 2-step consensus algorithm to run is f2. The allowable number of shutdowns in the 2-step consensus is defined by $f2-b2$. The allowable number of shutdowns represents the number of servers allowed to shut down due to a failure when a b2 number of servers 1 have a byzantine failure.

In the selection quorum, the size of the selection quorum Q1 is represented by $Q1=n21-f21$. The number of processes (number of servers 1) n21 satisfies $n21>2f21+b21$, where the allowable number of failures of the selection quorum is f21, the allowable number of byzantine failures is b21, f21 is the same value as f2, and b21 is the same value as b2

The determination of the matched value and the determination of "empty" in the first stage part 220-A are conducted as follows:

Determination of Matched Value

In the determination of matched value within the selection quorum Q1, when all the values match, the value is set to the matched value.

Determination of "Empty"

When there is no matched value in the selection quorum Q1, the value is set to "empty."

Next, the counting quorum Q2 will be explained.

FIG. 19 illustrates an example in which the size of the counting quorum Q2 received by the second stage part 220-B is 6. In this example, the second stage part 1 (220-B) receives six requests A, and the second stage part 2 (220-B) receives three requests A, two empty values B, and one abnormal value β caused by a byzantine failure.

In the counting quorum Q2, the conditions for the quorum comparison such as the number of processes (number of servers 1) differ from those of the selection quorum Q1, and the determination of the decision value and estimation value can be conducted with the number of processes n22 that satisfies $n22>2f22+2b22$, where f22 is the allowable number of failures of the servers 1 (process number), b22 is the allowable number of byzantine failures, f22 is the same value as f2, and b22 is the same value as b2. The size of the counting quorum Q2 satisfies $Q2=n22-f22$. In the second stage part 220-B, the determination of the decision value and estimation value is conducted as follows:

Determination of Decision Value

In the determination of decision value within the counting quorum Q2, when all the values match, the decision value is set to that value.

Determination of Estimation Value

The determination of the estimation value within the counting quorum Q2 is conducted when there is no decision value, and the value having the number of matches v that satisfies $v>b22$ is set to the estimation value. When no value satisfies the condition, the 2-step consensus unit 220 determines the estimation value as "empty."

The 2-step consensus unit 220 may conduct the determination process of the decision value and estimation value using a quorum comparison every time when a request or data is received in a manner similar to the process-saving 1-step consensus unit 210. It is the best if the determination process is conducted every time when new output from the first stage part 220-A arrives at the second stage part 220-B, but the present invention is not limited to this.

The 2-step consensus unit 220 would have the following two problems when a byzantine failure occurs.

Problem 1: when a byzantine failure occurs in the transmission and reception unit 110, the matched value that would have been obtained in the selection quorum Q1 is deemed "empty."

Problem 2: when a byzantine failure occurs in the first stage part 220-A, the decision value and the estimation value that would have been obtained in the counting quorum Q2 of the second stage part 220-B cannot be obtained in some cases. Also, in some cases, an abnormal value is used for the estimation value.

On the other hand, by conducting the determination process using quorums in the first stage part 220-A and the second stage part 220-B, the following effects are achieved.

First, even if byzantine failures occur in the transmission and reception unit 110 of a b21 number of servers 1, the selection quorum Q1 can properly identify the matched value and the result being "empty." Furthermore, even if byzantine failures occur in the first stage part 220-A of a b22 number of servers, the counting quorum Q2 can properly find the decision value and estimation value. In addition, an abnormal value would not be used for the estimation value.

In the 2-step consensus unit 220, the second stage part 220-B keeps receiving data from the first stage part 220-A until either one of the following conditions is met.

(Condition 4) Among the inputs received, the values from a Q2 (n22−f22) number of first stage parts 220-A match.

(Condition 5) Data has been received from the first stage parts 220-A of all of the accelerators 16 (other servers 1).

(Condition 6) A prescribed period of time has passed.

It is the best if the determination of these conditions in the second stage part 220-B is made every time when new value is input from the first stage part 220-A, but the present invention is not limited to this. The determination may be made at other timings such as when a predetermined number of inputs have been received by the second stage part 220-B and every time when new input has arrived thereafter, for example. The prescribed period of time may be a given time-out period defined by a definition file and the like, or a dynamic time-out period automatically calculated from the active statistic information.

<Combination Unit>

Even when byzantine failures occur in a b1 number of servers, the process-saving 1-step consensus unit 210 can obtain the decision value and estimation value properly. In addition, even when byzantine failures occur in a b2 number of servers, the 2-step consensus unit 220 can obtain the decision value and estimation value properly.

However, if a number of requests collide with each other and there are only a small number of matches, the decision value and estimation value cannot be obtained, and thus, the combination unit 240 outputs an arbitrary value selected from the values received by the transmission and reception units 110. In this case, it is possible that an abnormal value is selected as the arbitrary value.

In Embodiment 1 of the present invention, in order to prevent the accelerator 16 from outputting an abnormal value, a value that can be processed successfully (normal value) is identified at a timing of outputting the arbitrary value. This makes it possible to output a normal value as the arbitrary value, and the arbitrary value is more likely to coincide with the estimation value.

The combination unit 240 chooses the output of the process-saving 1-step consensus unit 210 or the 2-step consensus unit 220 as described below in accordance with the priority table 300 of FIG. 4.

(1) The decision value of the process-saving 1-step consensus unit 210 or the decision value of the 2-step consensus unit 220

(2) The estimation value of the 2-step consensus unit 220

(3) The estimation value of the process-saving 1-step consensus unit 210

(4) Output "combination empty." However, if any of the values output from the process-saving 1-step consensus unit 210 and the 2-step consensus unit 220 matches a value of the normal value table 330, the combination unit 240 outputs that value as well.

By conducting the determination process described above, the combination unit 240 selects and outputs the decision value or estimation value from the process-saving 1-step consensus unit 210 and the 2-step consensus unit 220 to the output unit 450 (see FIG. 3A and FIG. 3B), and if the estimation value does not exist, outputs the "combination empty" value, so that a normal value is set in the collision resolution value selection unit 260 described below.

With this configuration, it is possible to prevent the combination unit 240 from outputting an abnormal value due to a byzantine failure.

<Normal Value Selection Unit>

When a number of requests collide with each other and there are only a small number of requests that match, the combination unit 240 cannot obtain the decision value or estimation value, and thus outputs an arbitrary value. The normal value selection unit 250 functions to prevent an abnormal value from being output as this arbitrary value.

The normal value selection unit 250 identifies a value that can successfully be processed (normal value) at a timing of outputting the arbitrary value, and holds the value in the normal value table 330. The collision resolution value selection unit 260 described later selects a normal value by performing a quorum comparison of the combination decision value, the combination estimation value, the combination empty value, and the value of the normal value table 330 of each server 1, and causes the PAXOS consensus unit 40 to run with the normal value. In addition, the arbitrary value is more likely to coincide with the estimation value.

The normal value selection unit 250 collects the values received by the process-saving 1-step consensus unit 210 or the first stage part 220-A of the 2-step consensus unit 220 to execute each quorum, identifies a value with the number of matches that is greater than the allowable number of byzantine failures b3 as a value that can successfully be processed (normal value), and holds the value in the normal value table 330. The allowable number of byzantine failures b3 is the number of the transmission and reception units 110 that can have a byzantine failure (allowable number of byzantine failures) in the normal value selection algorithm, and may be the same value as b1 and b21. The number of received values collected by the normal value selection unit 250 (collection number c1) may be $n3-f3 \geq c1 \geq 3+1$, where f3 is the allowable number of failures that allows the normal value selection unit 250 to operate, and may be the same value as f1, f21, and f22. The allowable number of shut-downs in the normal value selection unit 250 is defined by f3−b3. If the normal value selection unit 250 is realized in the accelerator 16, a device that is not affected by a byzantine failure such as soft error may also be used. When the FPGA is used for the accelerator 16, the normal value selection unit 250 may be configured by a compact logical resource of the FPGA, a small amount of register, a block RAM where soft error is automatically corrected by ECC (error correction code), and the like, for example. Furthermore, n3 represents the number of normal value selection units 250 (the number of servers).

The normal value selection unit 250 may perform the determination of the normal value every time when a request is received from the process-saving 1-step consensus unit 210 or the first stage part 220-A of the 2-step consensus unit 220. Furthermore, the normal value selection unit 250 may conduct the process of determining and holding the normal value at a desired timing before the combination unit 240 determines the combination empty and executes the PAXOS consensus algorithm. Alternatively, the normal value selection unit 250 may conduct the process of determining the normal value at the same timing as the process-saving 1-step consensus unit 210 or the 2-step consensus unit 220 determines the result of "not decided," before the process of the combination unit 240.

<Collision Resolution Value Selection Unit>

Even if a byzantine failure occurs in the transmission and reception unit 110 or the like, by conducting the determination process in the process-saving 1-step consensus unit 210, the 2-step consensus unit 220, and the combination unit 240, a normal value can be output as the decision value, estimation value, or arbitrary value. However, if a byzantine failure occurs in each determination unit of the accelerator 16 and the combination unit 240, the following problem would occur.

(1) An abnormal value is output as the collision resolution value (estimation value and arbitrary value) that is used to reach a consensus in the PAXOS consensus unit 40.

(2) An abnormal value is output as the decision value to perform data processing.

In Embodiment 1 of the present invention, in order to solve the problem (1) above, the collision resolution value selection unit 260 conducts a quorum comparison before requesting the PAXOS consensus unit 40 to reach a consensus.

The collision resolution value selection unit 260 collects the combination decision value, the combination estimation value, the combination empty value and the normal value (most frequent value) from the respective accelerators 16, and the PAXOS consensus unit 40 executes a consensus with a value having the number of matches that is greater than the allowable number of byzantine failures b4 (collision resolution value). b4 is the number of the determination units and combination units 240 that can have a byzantine failure (allowable number of byzantine failures) in the collision resolution value selection algorithm, and may be the same value as b1, b21, b22, and b3. The number of collision resolution values collected by the collision resolution value selection unit 260 (collection number c2) may be n4−f4≥c2≥b4+f1, where f4 is the allowable number of failures that allows the collision resolution value selection unit 260 to operate, and may be the same value as f1, f21, f22, and f3. The allowable number of shutdowns in the collision resolution value selection unit 260 is defined by f4−b4. If the collision resolution value selection unit 260 is realized in the accelerator 16, a device that is not affected by a byzantine failure such as soft error may also be used. When the FPGA is used for the accelerator 16, the collision resolution value selection unit 260 may be configured by a compact logical resource of the FPGA, a small amount of register, a block RAM where soft error is automatically corrected by ECC (error correction code), and the like, for example. Furthermore, n4 represents the number of collision resolution value selection units (the number of servers).

With the process described above, the collision resolution value selection unit 260 can solve the problem (1). However, as described below, there are some cases in which a consensus cannot be reached by the PAXOS consensus unit 40.

For example, in a case in which the inputs include the decision value and estimation value, if only one accelerator 16 obtains the estimation value, the collision resolution value selection unit 260 cannot cause the PAXOS consensus unit 40 to reach a consensus. This is because there are no other accelerators 16 that transmit the estimation value by multicast to the collision resolution value selection unit 260, except for one accelerator 16 (server 1), and thus the number of matches cannot be compared. When the PAXOS consensus unit 40 cannot operate, the accelerator 16 cannot obtain a request to process.

The following three cases are examples of the case in which a consensus cannot be reached by the PAXOS consensus unit 40.

(1-1) Requests for both the servers 1 (accelerators 16) that obtain the decision value from the combination unit 240 and the severs 1 that obtain the estimation value from the combination unit 240 are input, and the number of the servers 1 that have obtained the estimation value is less than b4 (allowable number of byzantine failures)+1.

(1-2) Requests for both the servers 1 (accelerator 16) that obtain the estimation value and the severs 1 that obtain the arbitrary value are input, and the number of the servers 1 that have obtained the estimation value is less than b4 (allowable number of byzantine failures)+1.

(1-3) Many request collide with each other, and the outputs from the combination units 240 of the respective servers 1 (estimation value, combination empty, and normal value) do not reach the number of matches equal to or greater than b4 (allowable number of byzantine failures)+1.

A method to solve the case (1-1) above will be explained.

If the servers 1 (accelerators 16) that obtain the decision value and the severs 1 that obtain the estimation value both exist, and the number of the servers 1 that have obtained the estimation value is less than b4 (allowable number of byzantine failures)+1, the server 1 that has obtained the decision value in the combination unit 240 transmits the executed decision value or the decision value immediately before execution to the collision resolution value selection unit 260 of each accelerator 16 by multicast.

This makes it possible for the collision resolution value selection unit 260 to cause the PAXOS consensus unit 40 to conduct the consensus process using the same value as the decision value to be executed (as described above, the estimation value is always the same as the decision value).

A method to solve the case (1-2) above will be explained.

If the servers 1 that obtain the estimation value and the servers 1 that obtain the arbitrary value both exist, and the number of the servers 1 that have obtained the estimation value is less than b4 (allowable number of byzantine failures)+1, the following resolution method is used.

First, the combination unit 240 of each server 1 sends information indicating that no decision value or estimation value was obtained (determination of combination empty) to the collision resolution value selection unit 260.

When the collision resolution value selection unit 260 has collected a b4+1 (b4=allowable number of byzantine failures) number of pieces of the determination of "combination empty," the collision resolution value selection unit 260 can determine that the decision value was not obtained by any of the servers 1. If there is a server 1 that has obtained the decision value, the servers 1 that could not obtain the decision value would always obtain the estimation value, which is the same value as the decision value. Thus, if there is a server 1 that outputs "combination empty," that means that the decision value was not obtained by any of the servers 1.

The reason for collecting the b4 (allowable number of byzantine failures)+1 number of the outputs of "combination empty" is because the b4 (allowable number of byzantine failures) number of the servers 1 having byzantine failures might transmit "combination empty" incorrectly.

When the number of outputs of "combination empty" is equal to or greater than b4 (allowable number of byzantine failures)+1, the collision resolution value selection unit 260 can determine that a decision value does not exist, and it is necessary to cause the PAXOS consensus unit 40 to reach a consensus with any one of the normal values (collision resolution values). Below, after each combination unit 240 selects and outputs a normal value (or most frequent value), the collision resolution value selection unit 260 collects a c2 number of those outputs, and causes the PAXOS consensus unit 40 to reach a consensus using a value that has the number of matches equal to or greater than the allowable number of byzantine failures b4+1.

The collection number c2 needs to satisfy n4−f4≥c2≥b4+1, and in the best-case scenario, c2 can be the allowable number of byzantine failures b4+1. Because a decision value does not exist, the collision resolution value selection unit 260 may cause the PAXOS consensus unit 40 to reach a consensus with a value other than the estimation value. Because a normal value and most frequent value is likely to coincide with the estimation value, and the waiting time before the consensus is reached by the PAXOS consensus unit 40 can be reduced, it is possible to reduce latency up to the point where a consensus is reached.

Each determination described above may be conducted every time when a new value is received. In this case as well, because the waiting time before the consensus is reached by the PAXOS consensus unit 40 can be reduced, it is possible to reduce latency up to the point where a consensus is reached.

A method to solve the case (1-3) above will be explained.

When the collision resolution value selection unit 260 collects a c2 number of outputs from the respective combination units 240, if a value having the number of matches equal to or greater than the allowable number of byzantine failures b4+1 does not exist, or the number of "combination empty" outputs is less than the allowable number of byzantine failures b4+1, a consensus cannot be reached by the PAXOS consensus unit 40. This state is possible in the following cases (a) and (b).

(a) Many requests collide with each other, and in the collision resolution value selection unit 260, the normal values (most frequent values) of the respective servers 1 do not have the number of matches equal to or greater than the allowable number of byzantine failures b4+1.

(b) Many requests collide with each other, and in the collision resolution value selection unit 260, the values selected as the estimation values by the respective servers 1 do not have the number of matches equal to or greater than the allowable number of byzantine failures b4+1, and the number of "combination empty" is smaller than the allowable number of byzantine failures b4+1.

In the cases (a) and (b) described above, because many requests collide with each other, even when the collision resolution value selection unit 260 collects a c2 number of values, an input into the PAXOS consensus unit 40 cannot be determined, which could stop the consensus process.

In Embodiment 1 of the present invention, when an input into the PAXOS consensus unit 40 cannot be determined even after collecting a c2 number of values as in (a) and (b) above, the collision resolution value selection unit 260 inputs the value "empty" to the PAXOS consensus unit 40, and waits for the value obtained as a result of the collision resolution by the PAXOS consensus unit 40.

When the value obtained as a result of the collision resolution by the PAXOS consensus unit 40 is "empty," the collision resolution value selection unit 260 can determine that inputs from the respective servers 1 were inputs that cannot result in a consensus as described in (a) and (b) above. This determination allows the PAXOS consensus value determination unit 400 to conduct a consensus process again by automatic retry, or stop the process. If another collision resolution value selection unit 260 inputs a value that is obtained as a result of the collision resolution and that is not empty to the PAXOS consensus unit 40, and that value was a value that resolved the collision, the process continues.

Below are the examples of the operation to determine inputs that cannot reach a consensus.

When the PAXOS consensus value determination unit 400 determines that values that cannot result in a consensus were input, one of the following processes (i) and (ii) is conducted. If the PAXOS consensus value determination unit 400 is realized in the accelerator 16, a device that is not affected by a byzantine failure such as soft error may also be used. When the FPGA is used for the accelerator 16, the PAXOS consensus value determination unit 400 may be configured by a compact logical resource of the FPGA, a small amount of register, a block RAM where soft error is automatically corrected by ECC (error correction code), and the like, for example.

(i) The PAXOS consensus value determination unit 400 notifies the client 3 of the fact that a consensus was not reached. This can reduce the latency. This means that the result indicating that a consensus was not reached can be sent to the client first before stopping the process with a time-out or the like.

(ii) The distributed consensus is tried again (continuous mode)

In this case, it is possible to obtain a consensus value by automatic retry. The distributed consensus is tried again by selecting the received value of the transmission and reception unit 110 of each accelerator 16, or the normal value or most frequent value, and transmitting the selected value to the transmission and reception unit 110 of each accelerator 16 by multicast.

When the values that cannot reach a consensus are input, the process to be conducted, i.e., (i) or (ii) described above, is determined based on whether the distributed processing system is in a continuous mode or not. The continuous mode can be enabled/disabled by the definition file that is read when starting up the distributed processing system. The definition file can be stored in the memory 12, for example. When a byzantine failure in the PAXOS consensus value determination unit 400 needs to be considered, instead of determining whether or not a consensus has been reached by the PAXOS consensus value determination unit 400, a response (consensus value) from the PAXOS consensus unit 40 is output to the output unit 450 so that the data storage unit 140 is replicated as described below. By conducting one of (i) and (ii) described above after performing a quorum comparison, including the processing result of "empty" (result indicating that a consensus was not reached), invalid resulting results would not be returned to the client.

Next, to solve the problem of (2), a technology of making redundant configuration of a unit configured to return the processing result to the client 3 (data storage unit 140) so that invalid processing result would not be returned to the client is known. When each server 1 is configured to conduct a quorum comparison on the processing result to be returned to the client 3, the processing results of other two accelerators 16 are collected, and the processing result having a greater number of matches is returned to the client 3. The number of collections is 2b5+1, and is b5+1 in the best-case scenario, b5 is the number of the data storage units 140 that can have a byzantine failure (allowable number of byzantine failures), and may be the same value as b1, b21, b22, b3, and b4. The quorum comparison may be conducted by the client 3 that is configured to receive the processing result, instead of each accelerator 16.

<Number of Times of Communications>

The required number of processes (servers) for reaching a consensus in the process-saving 1-step consensus unit 210 and the 2-step consensus unit 220, the minimum number of times of communications δ, and the allowable number of failures e that can maintain the minimum number of times of communications δ will be explained below. In the following description, f3=f4=3, and b3=b4=b5=1.

First, when a consensus is reached by the process-saving 1-step consensus unit 210, the normal value selection unit 250, and the collision resolution value selection unit 260, the required number of processes n1 is represented by n1>2q+f1+2b1, where the allowable number of failures is f1, the allowable number of failures that can maintain the minimum latency is q, and the allowable number of byzantine failures is b1.

When the allowable number of failures that can maintain the minimum latency q is 1, the allowable number of failures f1 is 3, and the allowable number of byzantine failures b1 is 1, the minimum value of the required number of processes n1 is 8.

Next, when a consensus is reached by the process-saving 1-step consensus unit 210, the normal value selection unit 250, and the collision resolution value selection unit 260, the minimum number of times of communications δ=2. The minimum number δ of times of communications is the number of times of communications conducted after the request is received from the client 3 before a consensus is reached between the servers 1. The allowable number of failures e that can maintain the minimum number of times of communications δ corresponds to the allowable number of failures that can maintain the minimum latency q(=1).

As illustrated in FIG. 3A and FIG. 3B, the update request for data is received from the client 3-1 at the first time of communications, and the transmission and reception units 110 of the respective servers 1 transmit the received data to the other servers 1 at the second time of communications (M2, see FIG. 3A and FIG. 3B). When the decision value is obtained by the process-saving 1-step consensus unit 210, the consensus value between the servers 1 can be obtained at two times of communications in total.

On the other hand, in the 2-step consensus, when the 2-step consensus unit 220, the normal value selection unit 250, and the collision resolution value selection unit 260 conduct the consensus process, the number of processes is n2, and the allowable number of failures and the like, which differ between the first stage part 220-A (selection quorum Q1) and the second stage part 220-B (counting quorum Q2), are defined as follows.

When the allowable number of failures and the allowable number of byzantine failures in the first stage part 220-A are f21 and b21, respectively, and when the allowable number of failures and the allowable number of byzantine failures in the second stage part 220-B are f22 and b22, respectively, the number of processes n2 can be represented by the following equation: n2>max(2f21+b21, 2f22+2b22), where max(x, y) is a function to output x or y, whichever is greater.

In the 2-step consensus, when the allowable number of failures f21=f22=3, and the allowable number of byzantine failures b21=b22=1, the number of processes n2=9 is the minimum number.

As illustrated in FIG. 3A and FIG. 3B, as for the minimum number δ of times of communications in the 2-step consensus, the update request for data is received from the client 3-1 at the first time of communications, the transmission and reception units 110 of the respective servers 1 transmit the received data to the first stage parts 220-A of the other servers 1 at the second time of communications, and then the results of the first stage parts 220-A to the second stage parts 220-B of the respective servers 1 at the third time of communications (M2, M3, see FIG. 3A and FIG. 3B).

When the decision value is obtained in the counting quorum Q2, the 2-step consensus unit 220 can obtain the consensus value between the servers 1 at three times of communications in total, and as a result, the minimum number δ of times of communications is 3.

The allowable number of failures e that can maintain the minimum number of times of communications δ corresponds to the allowable number of failures f2 of the 2-step consensus, and f2 is represented by the following formula: f2=min (f21, f22), where min(x, y) is a function to output x or y, whichever is smaller. When f21=f22=3, f2=3, which results in e=3. This means that, with the 2-step consensus, the minimum number of times of communications δ is greater than that of the process-saving 1-step consensus, but the availability of the distributed data management system increases.

Furthermore, when the combination unit 240 is added to the process-saving 1-step consensus unit 210 and the 2-step consensus unit 220, and a consensus is reached by the normal value selection unit 250 and the collision resolution value selection unit 260, and if the number of processes is n and the other values are defined as above, the number of processes n is represented by the following formula: n=max (2q+f1+2b1, 2f21+b21, 2f22+2b22), where max(x, y, z) is a function to output x, y, or z, whichever is greater.

When the process-saving 1-step consensus unit 210 and the 2-step consensus unit 220 are combined, and if the allowable number of failures q=1, the allowable number of failures f1=f21=f22=3, and the allowable number of byzantine failures b1=b21=b22=1, the minimum number of processes n=9. This number of processes n can be reduced while maintaining the minimum number of times of communications δ and the allowable number of failures e by using the methods described in Embodiment 2 and Embodiment 3 described below.

The minimum number of times of communication δ in the case of combining the process-saving 1-step consensus unit 210 and the 2-step consensus unit 220 is the value obtained when a decision value is output from the process-saving 1-step consensus unit 210 as described above, and the minimum number of times of communications δ=2.

The allowable number of failures e that can maintain the minimum number of times of communications δ corresponds to that of the 2-step consensus, i.e., e=3. Thus, by combining the process-saving 1-step consensus unit 210 and the 2-step consensus unit 220, the same level of availability as the 2-step consensus can be ensured while maintaining the minimum number of times of communications δ and the number of servers (number of processes) of the process-saving 1-step consensus.

<Process Overview>

FIG. 3A and FIG. 3B is a diagram illustrating an example of the distributed data management performed by the servers 1 of the present invention. In this example, the client 3-1 transmits a processing request of data A to the servers 1-1 to 1-n by multicast. The multicast transmission from the client 3-1 to each server 1 may be performed by a control computer, which is not shown in the figure.

The transmission and reception unit 110 of each server 1 transmits the data received from the client 3-1 to the other servers 1 by multicast (M2 in the figure). The servers 1 each transmit the data received from the server 1 to the update unit 130, and determine the degree of consistency.

The update unit 130 inputs the data within the decision quorum (or estimation quorum) illustrated in FIG. 17 to the process-saving 1-step consensus unit (SP1-STEP of FIG. 3A) 210. The update unit 130 inputs the data within the selection quorum (or counting quorum) illustrated in FIGS. 18 and 19 to the 2-step consensus unit 220.

When all the pieces of data input from the decision quorum match, the process-saving 1-step consensus unit 210 sets the data as a decided value (decision value). When the majority of pieces of input data among the pieces of data input from the estimation quorum match, the process-saving 1-step consensus unit 210 sets the data as the estimation value.

Otherwise, the process-saving 1-step consensus unit 210 notifies the combination unit 240 of the output being "not decided."

Next, if all the pieces of data input from the selection quorum match in the first stage part 220-A (2-STEP (1) of FIG. 3A), the 2-step consensus unit 220 sets the data as a matched value, and transmits the matched value to the second stage part 220-B (2-STEP (2) of FIG. 3A) (M3).

If all the pieces of data input from the counting quorum match, the second stage part 220-B outputs the data as the decision value. If some pieces of data input from the counting quorum match, the second stage part 220-B outputs the data as the estimation value.

Otherwise, the second stage part 220-B notifies the combination unit 240 of the output being "not decided."

Next, the update unit 130 inputs the output of the process-saving 1-step consensus unit 210 and the output of the 2-step consensus unit 220 to the combination unit 240. As illustrated with FIG. 4 or FIG. 5, the combination unit 240 chooses the output of the process-saving 1-step consensus unit 210 or the 2-step consensus unit 220 in accordance with the priorities set in advance.

First, as a first priority, the combination unit 240 selects one of the decision value of the process-saving 1-step consensus unit 210 and the decision value of the 2-step consensus unit 220 as the consensus value (combination decision value).

The decision value of the process-saving 1-step consensus unit 210 is a value with which all the pieces of data within the decision quorum Qe of the servers 1 match. The decision value of the 2-step consensus unit 220 is a value with which all the pieces of data that the second stage part 220-B received from the counting quorum (Q2) of the servers 1 match.

As a second priority, the combination unit 240 selects the estimation value of the 2-step consensus unit 220. The estimation value of the 2-step consensus unit 220 is a value with which some pieces of data that the second stage part 220-B received from the counting quorum of the servers 1 match.

As a third priority, the combination unit 240 selects the estimation value of the process-saving 1-step consensus unit 210. The estimation value of the process-saving 1-step consensus unit 210 is a value with which a majority of the pieces of input data among the data received from the estimation quorum of the servers 1 matches.

As a fourth priority, the combination unit 240 selects the "combination empty" only, or the "combination empty" and the normal value. This normal value is a value output from the process-saving 1-step consensus unit 210 or the 2-step consensus unit 220 that matches the normal value table 330.

The combination unit 240 selects the output of the process-saving 1-step consensus unit 210 or the 2-step consensus unit 220 based on the priorities shown in FIG. 4, and then outputs the selected data as it is when the selected data is the decision value.

Meanwhile, when the estimation value or the "combination empty' (or the "combination empty" and normal value) is selected, the combination unit 240 needs to execute the consensus algorithm with the other servers 1. Thus, before reaching a consensus in the PAXOS consensus unit 40, the server 1 first conducts the quorum comparison described above in the collision resolution value selection unit 260, and then requests the PAXOS consensus unit 40 to reach a consensus.

The collision resolution value selection unit 260 prevents an abnormal value from being input to the PAXOS consensus unit 40 using the normal value or the most frequent value in the normal value selection unit 250, selects a value that can result in a consensus, and requests the PAXOS consensus unit 40 to reach a consensus.

The result of the PAXOS consensus unit 40 of each server 1 is input to the PAXOS consensus value determination unit 400, and when a consensus is reached, the PAXOS consensus value determination unit 400 inputs the consensus value to the data storage unit 140 and responds to the client 3 after conducting a prescribed process.

When a consensus is not reached, the PAXOS consensus value determination unit 400 sends to the client 3 a notification that no consensus was obtained. Furthermore, if a consensus is reached, the PAXOS consensus value determination unit 400 outputs the consensus value to the output unit 450 (see FIG. 3A and FIG. 3B).

As described above, in Embodiment 1 of the present invention, two consensus algorithms of the process-saving 1-step consensus unit 210 and the 2-step consensus unit 220 are combined, and furthermore, when the decision value or estimation value cannot be obtained from these two consensus algorithms, the combination unit 240 outputs "combination empty," the normal value, or the most frequent value. Furthermore, the collision resolution value selection unit 260 selects a value that can result in a consensus in the PAXOS consensus unit 40 from the outputs of the combination unit 240, and requests the PAXOS consensus unit 40 to reach a consensus.

As a result, even if a byzantine failure occurs in each part of the accelerator 16, it is possible to reduce the minimum number of times of communications until the server 1 reaches a consensus after the server 3 requests the server 1 to process data, while preventing an abnormal value from being used or output, and suppressing an increase in the number of processes (or the number of servers). In Embodiment 1 of the present invention, even if a byzantine failure occurs, the process continues normally without detecting or correcting the byzantine failure, and the processing result can be returned to the client 3.

In addition, in Embodiment 1, a byzantine failure that occurs in each part of the accelerator 16 is addressed in the following manner.

In the process-saving 1-step consensus unit 210, even if a byzantine failure occurs in the transmission and reception unit 110, the decision value and estimation value can be properly determined in the 1-step consensus. In the 2-step consensus unit 220, even if an abnormal value is input due to a byzantine failure, the decision value and estimation value can be properly determined. The process-saving 1-step consensus unit 210 and the 2-step consensus unit 220 output "not decided" if the decision value or estimation value is not obtained.

When a byzantine failure occurs in the process-saving 1-step consensus unit 210 or 2-step consensus unit 220, and the decision value or estimation value does not exist, the combination unit 240 outputs a normal value as the arbitrary value so that an abnormal value would not be output.

Also, even when a byzantine failure occurs in the process-saving 1-step consensus unit 210, the 2-step consensus unit 220, or the combination unit 240, the collision resolution value selection unit 260 can conduct the PAXOS consensus with a normal value. Furthermore, even when a byzantine failure occurs, the data storage unit 140 can return a normal processing result to the client 3.

<Detailed Description of Process>

Figure 8:
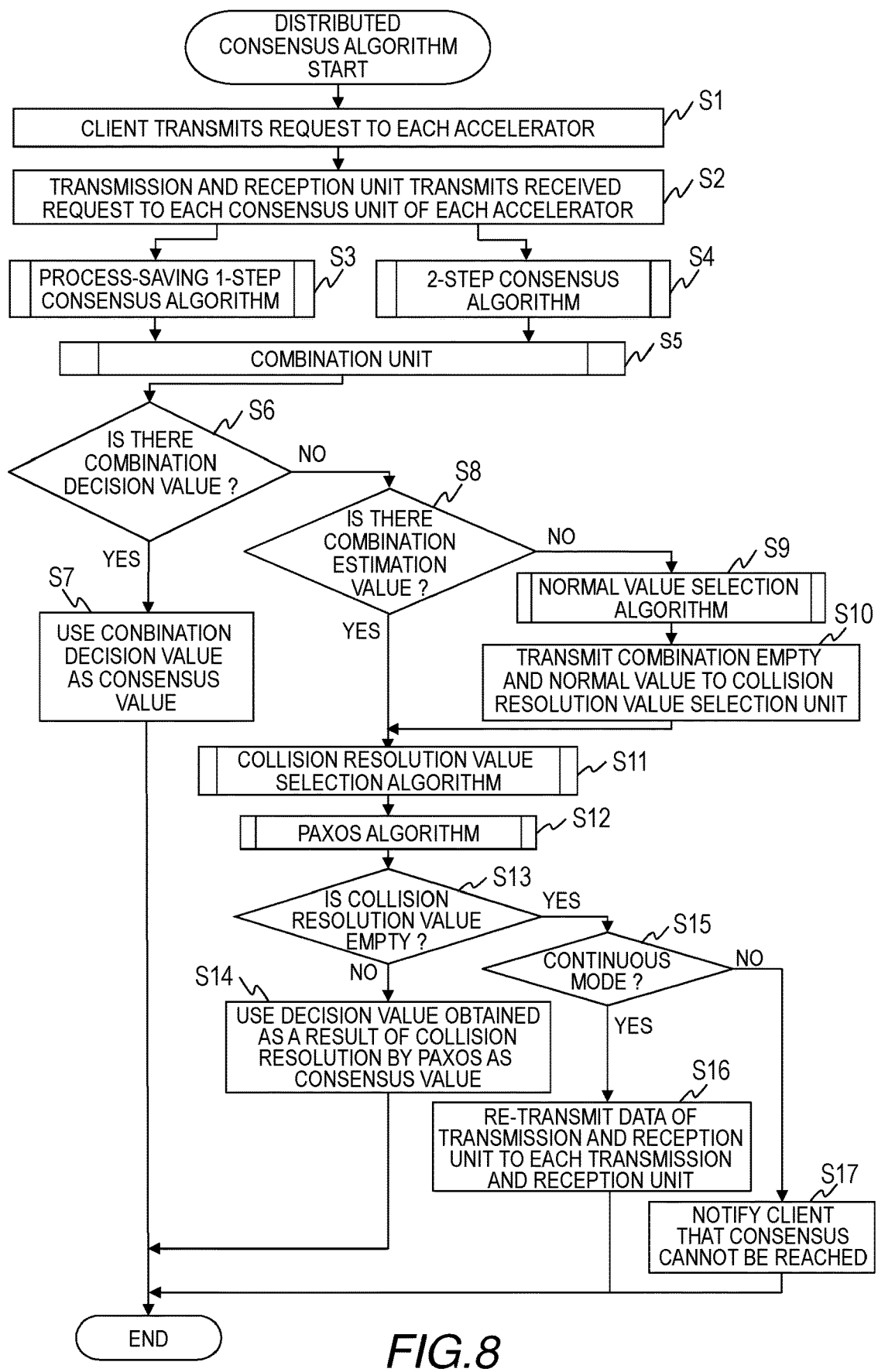
FIG. 8 is a flowchart illustrating an example of a process performed by each server according to the first embodiment of this invention.

FIG. 8 is a flowchart illustrating an example of a process performed by each server 1. This process is performed when the server receives a data processing request from the client 3.

First, in the server 1, the transmission and reception unit 110 of the accelerator 16 receives data included in the processing request sent by multicast from the client 3 (S1).

Next, the transmission and reception unit 110 of the accelerator 16 sends the received data to the other servers 1 by multicast, and inputs the received data to the process-saving 1-step consensus unit 210 and the 2-step consensus unit 220 (S2)

Next, in Step S3, the process-saving 1-step consensus unit 210 executes the 1-step consensus process as described later with reference to FIG. 9 in response to the input of the processing request. In Step S4, the 2-step consensus unit 220 executes the 2-step consensus process as described later with reference to FIG. 10 in response to the input of the processing request. In the example of the figure, the process-saving 1-step consensus process (S3) and the 2-step consensus process (S4) are conducted in parallel, but these two processes may alternatively be conducted one after another.

Figure 11:
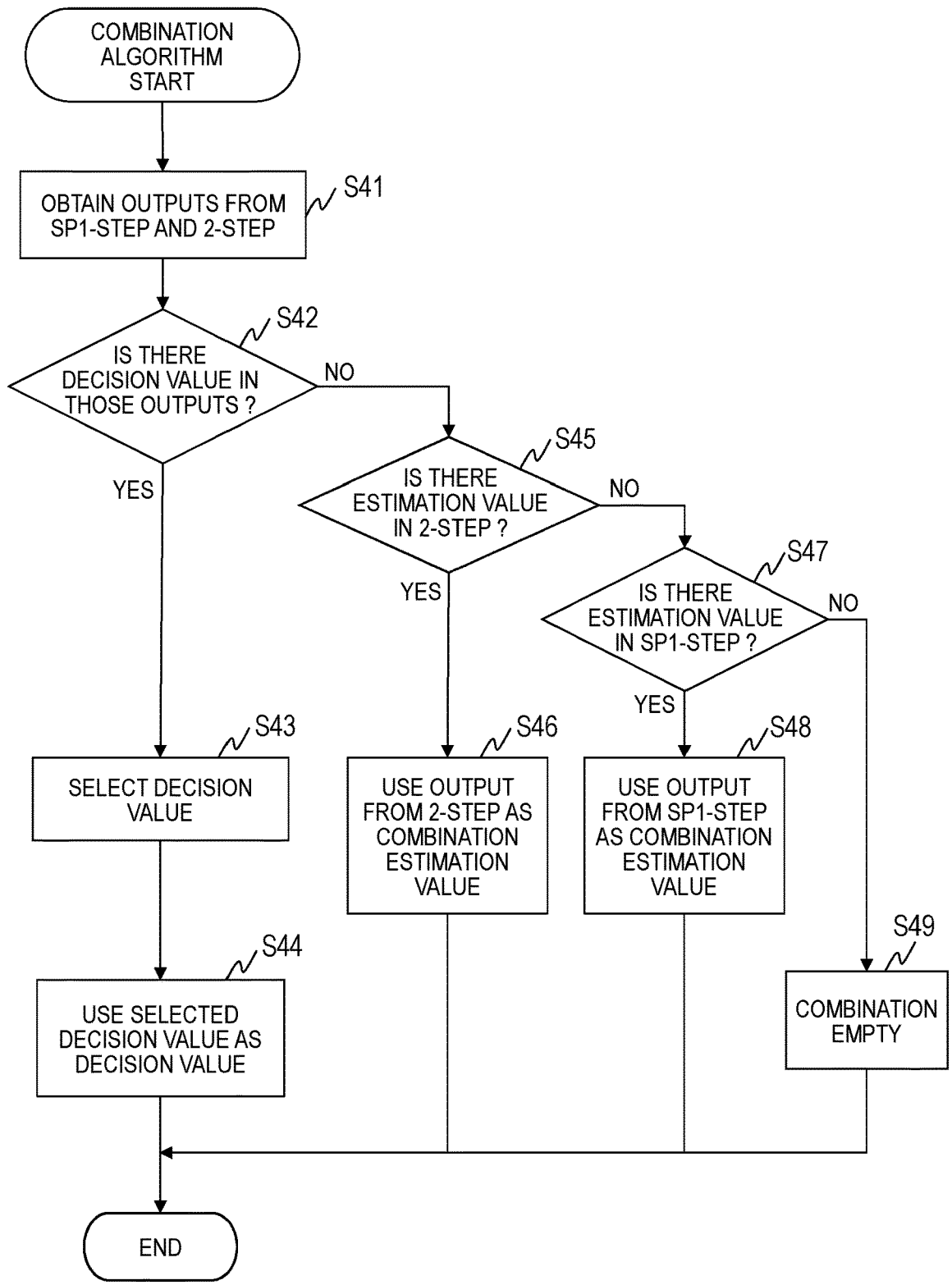
FIG. 11 is a flowchart illustrating an example of a process conducted by the combination unit according to the first embodiment of this invention.

In Step S5, the combination unit 240 receives the output of the process-saving 1-step consensus unit 210 (decision value, estimation value, or "not decided") and the output of the 2-step consensus unit 220 (decision value, estimation value, or "not decided"), and conducts the combination process illustrated by FIG. 11.

In Step S6, the update unit 130 of the server 1 determines whether or not a decision value has been output from the combination unit 240. When a decision value has been output, the update unit 130 proceeds to Step S7, and outputs the decision value as the consensus value. The update unit 130 inputs the output consensus value to the data storage unit 140, and returns the result of conducting a prescribed process to the client 3 via the transmission and reception unit 110.

On the other hand, when a decision value was not output from the combination unit 240, the update unit 130 proceeds to Step S8, and determines whether an estimation value has been output or not. When an estimation value has been output, the update unit 130 proceeds to Step S11, and conducts the collision resolution value selection process in the collision resolution value selection unit 260. When an estimation value has not been output, the update unit 130 proceeds to Step S9, and conducts the normal value selection process in the normal value selection unit 250.

Figure 13:
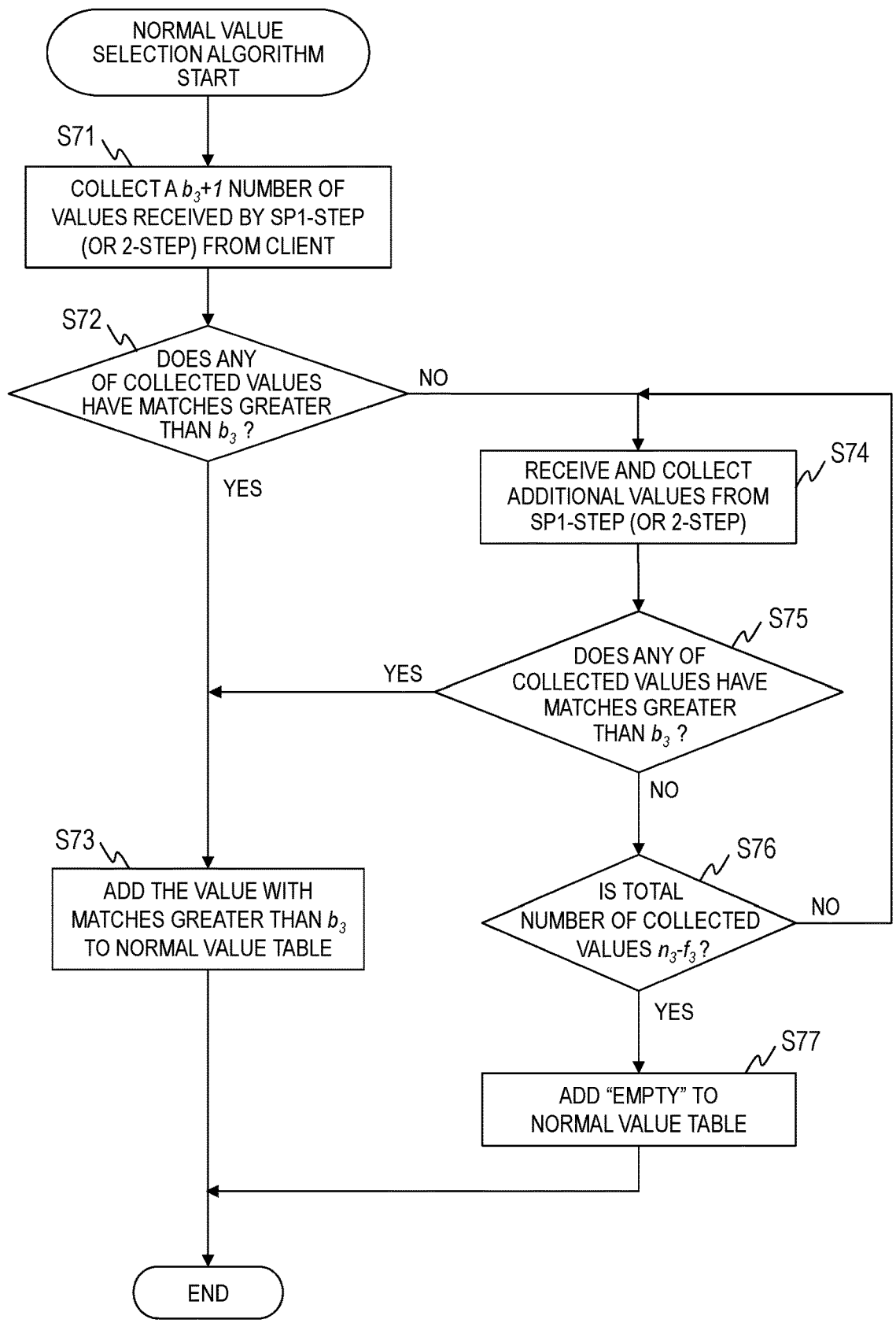
FIG. 13 is a flowchart illustrating an example of a process conducted by the normal value selection unit according to the first embodiment of this invention.

In Step S9, as shown in FIG. 13, the normal value selection unit 250 adds data to the normal value table 330 based on the values received from the respective transmission and reception units 110 for the consensus processing by the process-saving 1-step consensus unit 210 (or 2-step consensus unit 220).

In Step S10, the normal value selection unit 250 transmits the normal value added to the normal value table 330 and the combination empty value to the collision resolution value selection unit 260, and proceeds to Step S11.

Figure 12:
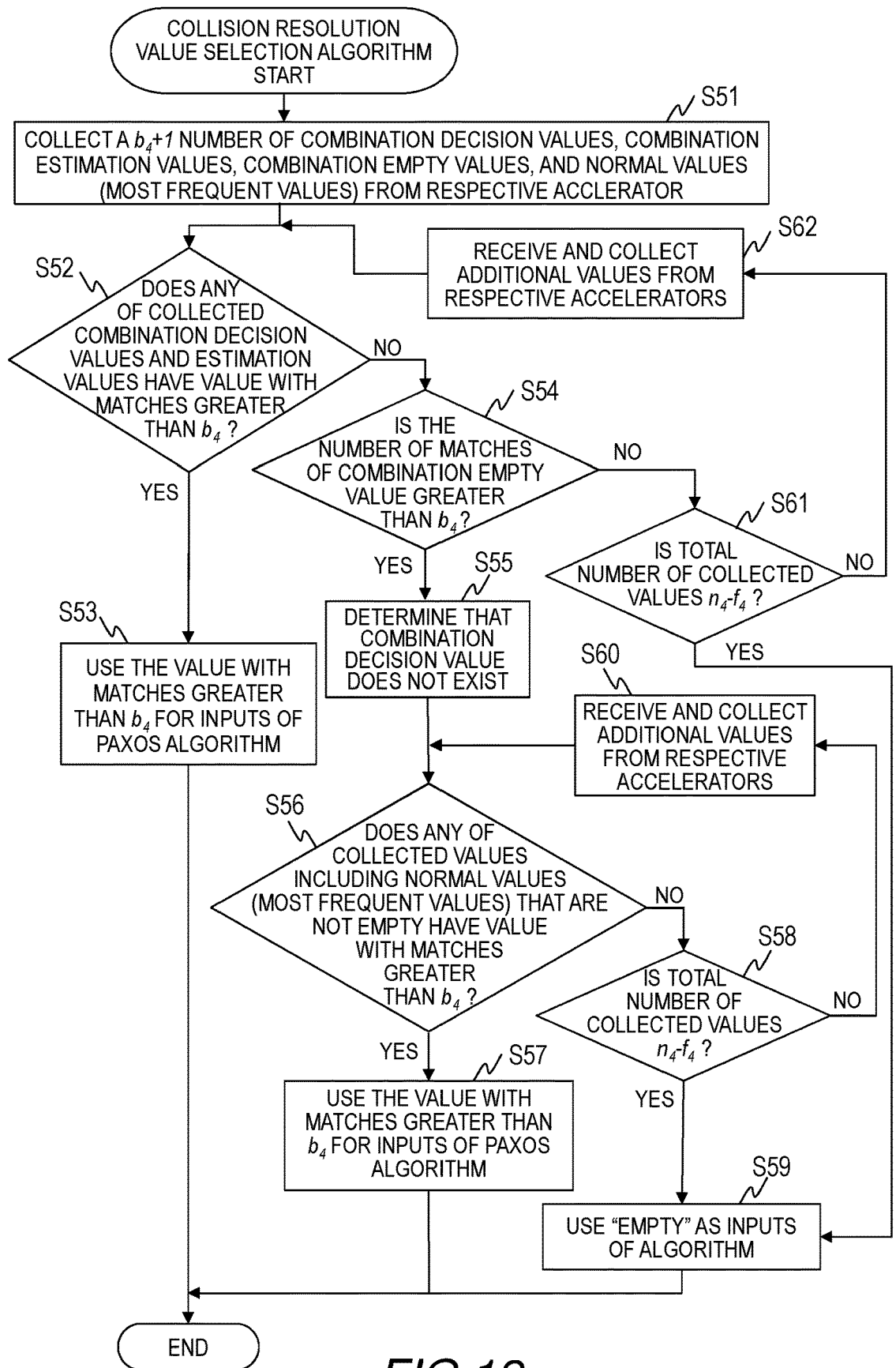
FIG. 12 is a diagram illustrating an example of the consensus process conducted by the collision resolution value selection unit according to the first embodiment of this invention.

In Step S11, the collision resolution value selection unit 260 receives the estimation value from the combination unit 240 or the normal value and the combination empty value from the normal value selection unit 250, and conducts the collision resolution value selection process illustrated in FIG. 12.
The collision resolution value selection unit 260 collects outputs from the combination units 240 of the respective accelerators 16, generates an input (collision resolution value) to the PAXOS consensus unit 40, and inputs the value to the PAXOS consensus unit 40.

In Step S12, the PAXOS consensus unit 40 tries to reach the consensus on the collision resolution value (proposal) between the respective servers 1 using the PAXOS algorithm, and responds to the update unit 130 of the accelerator 16. The PAXOS algorithm is a known algorithm, and is therefore not be described in detail in Embodiment 1.

In Step S13, the PAXOS consensus value determination unit 400 determines whether the response (collision resolution value) from the PAXOS consensus unit 40 is "empty" or not. The PAXOS consensus value determination unit 400 proceeds to Step S14 if the response is not "empty," and proceeds to Step S15 if the response is "empty."

In Step S14, the PAXOS consensus value determination unit 400 outputs the response (decision value) from the PAXOS consensus unit 40 as the consensus value. The consensus value is input to the data storage unit 140 as described above, and the processing result is returned to the client 3.

In Step S15, the PAXOS consensus value determination unit 400 refers to the memory 12 or the like to determine whether or not the accelerator 16 is in the continuous mode. The PAXOS consensus value determination unit 400 proceeds to Step S16 if the accelerator 16 is in the continuous mode, and proceeds to Step S17 if not.

In Step S16, the data received by the transmission and reception unit 110 is transmitted by multicast to the transmission and reception unit 110 of each server 1, and the process to reach a consensus is conducted again. For this process, the normal value or most frequent value held in the normal value selection unit 250 of each server 1 may be used. In Step S17, because a consensus is not reached between the respective servers 1, a notification indicating no consensus is transmitted to the client 3.

If a consensus value is obtained by the process described above, the data storage unit 140 conducts a prescribed process with the consensus value, and the accelerator 16 returns the processing result to the client 3. On the other hand, if a consensus value was not obtained, the accelerator 16 tries to achieve the consensus again or transmits the no-consensus notification, and ends the process.

<Process-Saving 1-Step Consensus Process>

Figure 9:
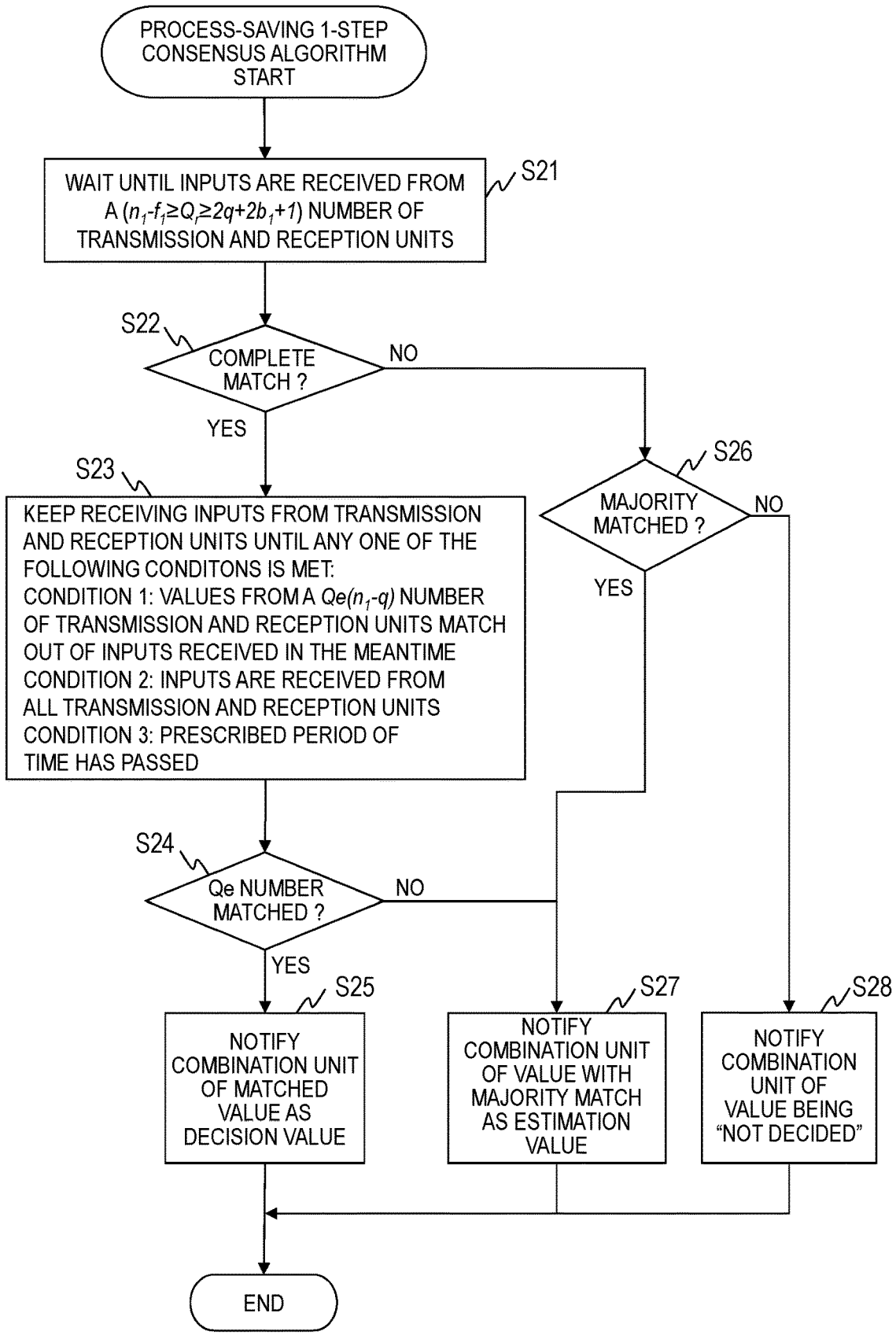
FIG. 9 is a diagram illustrating an example of the consensus process performed by the process-saving 1-step consensus unit according to the first embodiment of this invention.

FIG. 9 is a diagram illustrating an example of the consensus process performed by the process-saving 1-step consensus unit 210. This process is performed in Step S3 of FIG. 8.

The process-saving 1-step consensus unit 210 waits until the inputs (process requests) are received from the servers 1 of the same number of the size of the estimation quorum Qf ($n1-f1 \geq Qf \geq 2q+2b1+1$) (S21).

When receiving the inputs from the servers 1 of the same number as the size of the estimation quorum Qf, the process-saving 1-step consensus unit 210 determines whether or not all the input values, which is the same number as Qf, match (S22). When all the values match, the process proceeds to Step S23, and otherwise, the process proceeds to Step S26.

In Step S23, the process-saving 1-step consensus unit 210 keeps receiving an input from the transmission and reception unit 110 until one of the conditions 1 to 3 described above is met. When one of the following conditions is met, the process-saving 1-step consensus unit 210 proceeds to Step S24: (Condition 1) values received from the same number of transmission and reception units 110 as the decision quorum Qe match, out of the received inputs; (Condition 2) data has been received from all of the servers 1; or (Condition 3) a prescribed period of time has passed.

In Step S24, the process-saving 1-step consensus unit 210 determines whether the inputs of the same number of the decision quorum Qe, which were received in Step S23 above, match or not. If the input values match within the decision quorum Qe, the process proceeds to Step S25. In Step S25, the process-saving 1-step consensus unit 210 outputs the matched value within the decision quorum Qe to the combination unit 240 as the decision value.

In Step 26, which follows Step S22 if all of the values within the estimation quorum Qf do not match, the process-saving 1-step consensus unit 210 determines whether or not the majority of the values matches within the estimation quorum Qf. When the majority of the values matches within the estimation quorum Qf, the process proceeds to Step S27, otherwise, the process proceeds to Step S28.

In Step S27 where the values match within the estimation quorum Qf but the values do not match within the decision quorum Qe, or where the majority of the values matches within the estimation quorum Qf, the process-saving 1-step consensus unit 210 outputs the value with the majority match within the estimation quorum Qf to the combination unit 240 as the estimation value.

In Step S28, because the majority of the values does not match within the estimation quorum Qf, the process-saving 1-step consensus unit 210 outputs "not decided" to the combination unit 240

With the consensus process described above, the process-saving 1-step consensus unit 210 outputs one of the decision value, the estimation value, or "not decided" to the combination unit 240.

<2-Step Consensus Process>

Figure 10:
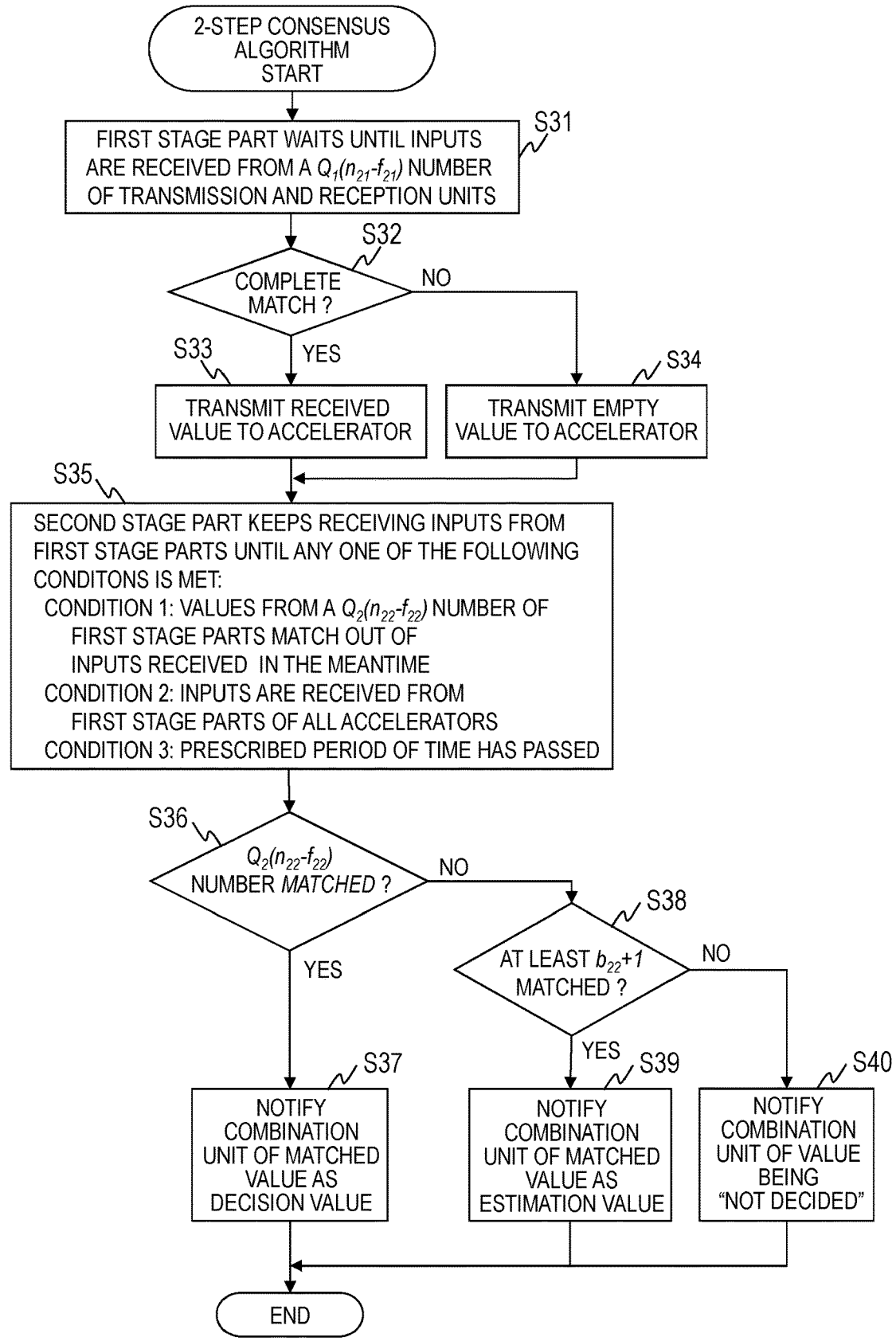
FIG. 10 is a flowchart illustrating an example of a process conducted by the 2-step consensus unit according to the first embodiment of this invention.

FIG. 10 is a flowchart illustrating an example of a process conducted by the 2-step consensus unit 220. This process is conducted in Step S4 of FIG. 8.

First, in Step S31, the first stage part 220-A of the 2-step consensus unit 220 stands by until inputs of the same number as the selection quorum Q1 (n21−f21) from the transmission and reception units 110. When receiving inputs of the same number as the selection quorum Q1, the first stage part 220-A proceeds to Step S32. In Step S32, the 2-step consensus unit 220 determines whether or not all the values of the input of the selection quorum Q1 match.

If all the values of the inputs match within the selection quorum Q1, the 2-step consensus unit 220 transmits the value of the received inputs to each accelerator 16 in Step S33. On the other hand, if the value of all the inputs does not match within the selection quorum Q1, the 2-step consensus unit 220 transmits the "empty" value to each accelerator 16 in Step S34.

In Step S35, the second stage part 220-B of the 2-step consensus unit 220 keeps receiving inputs from the first stage parts 220-A until one of the conditions 4 to 6 described above is met. The second stage part 220-B waits for the value transmitted by the first stage part 220-A of each accelerator 16 in Step S33 or Step S34.

That is, the second stage part 220-B of the 2-step consensus unit 220 proceeds to Step S36 when one of the following conditions is met: the value of the inputs from the first stage parts 220-A of the same number as the counting quorum Q2 (n22−f22) matches (Condition 4); inputs are received from the first stage part 220-A of all the accelerators 16 (Condition 5); or a prescribed period of time has passed (Condition 6).

In Step S36, the second stage part 220-B determines whether the values of the same number as the counting quorum Q2 (n22−f22) match or not, out of the input values. If the number of matches among the input values is equal to or greater than the number of the counting quorum Q2, the second stage part 220-B proceeds to Step S37, and outputs the matched value to the combination unit 240 as the decision value.

On the other hand, the number of matches among the input values is less than the number of the counting quorum Q2, the second stage part 220-B determines whether the number of matches is equal to or greater than the allowable number of byzantine failures b22+1 or not. If the number of matches is equal to or greater than the allowable number of byzantine failures b22+1, the second stage part 220-B proceeds to Step S39, and outputs the value with the number of matches equal to or greater than the allowable number of byzantine failures b22+1 to the combination unit 240 as the estimation value.

On the other hand, if the number of matches is less than the allowable number of byzantine failures b22+1 in Step S38, the second stage part 220-B notifies the combination unit 240 of the value being "not decided."

With those processes, in the 2-step consensus unit 220, the first stage part 220-A outputs the matched value within the selection quorum Q1, and the second stage part 220-B identifies the decision value or estimation value based on whether the output value has the number of matches equal to or greater than the counting quorum Q2, and if the consensus is not reached, the second stage part 220-A outputs "not decided."

<Combination Process>

FIG. 11 is a flowchart illustrating an example of a process conducted by the combination unit 240. This process is conducted in Step S5 of FIG. 8.

In Step S41, the combination unit 240 obtains outputs (decision value, estimation value, not decided) from the process-saving 1-step consensus unit (SP1-step in the figure) 210 and the 2-step consensus unit (2-step in the figure) 220. In Step S42, the combination unit 240 determines whether the outputs from the process-saving 1-step consensus unit 210 and the 2-step consensus unit 220 include a decision value or not.

If a decision value is included, the combination unit 240 proceeds to Step S43, and if not, the combination unit 240 proceeds to Step S45.

In Step S43, the combination unit 240 selects one of the decision value of the process-saving 1-step consensus unit 210 and the decision value of the 2-step consensus unit 220. In Step S44, the combination unit 240 outputs this selected decision value as the combination decision value.

In Step S45 where a decision value does not exist, the combination unit 240 determines whether the output of the 2-step consensus unit 220 includes an estimation value or not. If the output of the 2-step consensus unit 220 includes an estimation value, the combination unit 240 outputs this estimation value as the combination estimation value (S46).

If an estimation value does not exist in the output from the 2-step consensus unit 220, the combination unit 240 determines whether the output of the process-saving 1-step consensus unit 210 is an estimation value or not in Step S47. If the output of the process-saving 1-step consensus unit 210 is an estimation value, the combination unit 240 outputs this estimation value as the combination estimation value (S48).

On the other hand, if neither an estimation value nor decision value exists, the combination unit 240 outputs the value of "combination empty" (S49).

As described above, the combination unit 240 identifies a decision value or estimation value by combining the outputs of the process-saving 1-step consensus unit 210 and the 2-step consensus unit 220, and if neither of them exists, the combination unit 240 outputs the value of "combination empty."

<Normal Value Selection Process>

FIG. 13 is a flowchart illustrating an example of a process conducted by the normal value selection unit 250. This process is conducted in Step S9 of FIG. 8. In the example of FIG. 8, the normal value selection process is conducted after the combination process (S5), but the sequence of the normal value selection process is not limited to this. The normal value selection process may be conducted in parallel with the process-saving 1-step consensus process (S3) and the 2-step consensus process (S4), for example.

First in Step S71, the normal value selection unit 250 collects a b3 (allowable number of byzantine failures)+1 number of values (processing requests from the client 3 transmitted from the transmission and reception unit 110 of each server 1 by multicast) received by the process-saving 1-step consensus unit 210 (or the 2-step consensus unit 220) for the consensus process.

In Step S72, the normal value selection unit 250 determines whether the number of matches of any one of the collected input values is greater than the allowable number of byzantine failures b3 or not. The normal value selection unit 250 proceeds to Step S73 if there is a value greater than the allowable number of byzantine failures b3, and proceeds to Step S74 if not.

In Step S72, the normal value selection unit 250 adds the value with the matched number greater than the allowable number of byzantine failures b3 to the normal value table 330, and ends the process.

On the other hand, if the number of matches does not exceed the allowable number of byzantine failures b3, the normal value selection unit 250 receives and collects additional values from the process-saving 1-step consensus unit 210 (or 2-step consensus unit 220). Next, in Step S75, the normal value selection unit 250 determines whether the number of matches of any one of the collected input values is greater than the allowable number of byzantine failures b3 or not. The normal value selection unit 250 proceeds to Step S73 if there is a value greater than the allowable number of byzantine failures b3, and proceeds to Step S76 if not.

In Step S76, the normal value selection unit 250 determines whether the number of collected values reaches the maximum value (n3−f3) or not. If the number of collected values reaches n3−f3, the normal value selection unit 250 adds an empty value to the normal value table 330.
On the other hand, if the number of collected values does not reach the n3−f3, the normal value selection unit 250 returns to Step S74, and repeats the processes described above.

With the processes described above, the normal value selection unit 250 adds the value with the matched number meeting a prescribed condition or an empty value to the normal value table 330.

<Collision Resolution Value Selection Process>

FIG. 12 is a diagram illustrating an example of the consensus process conducted by the collision resolution value selection unit 260. This process is conducted in Step S11 of FIG. 8.

First, in Step S51, each accelerator 16 transmits by multicast the output from the combination unit 240 (combination decision value, combination estimation value, combination empty), and the normal value (or most frequent value) from the normal value selection unit 250 to the collision resolution value selection unit 260 (M4), and the collision resolution value selection unit 260 collects those values up to the same number as the allowable number of byzantine failures b4+1. The most frequent value will be described below with reference to FIG. 14.

The collision resolution value selection unit 260 collects values up to the allowable number of byzantine failures b4+1, and proceeds to Step S52. In Step S52, the collision resolution value selection unit 260 determines whether the number of matched values out of the collected decision values and estimation values (matched number) is greater than the allowable number of byzantine failures b4 or not. The collision resolution value selection unit 260 proceeds to Step S53 if there is a value with the number of matches greater than the allowable number of byzantine failures b4, and proceeds to Step S54 if not.

In Step S53, the collision resolution value selection unit 260 outputs the value with the matched number greater than the allowable number of byzantine failures b4 as an input to the PAXOS consensus unit 40 (collision resolution value), and ends the process.

On the other hand, in Step S54 where the matched number of the decision values or estimation values does not exceed the allowable number of byzantine failures b4, the collision resolution value selection unit 260 determines whether the number of matches of the combination empty value is greater than the allowable number of byzantine failures b4 or not. The collision resolution value selection unit 260 proceeds to Step S55 if the matched number of the combination empty value is greater than the allowable number of byzantine failures b4, and proceeds to Step S61 if not.

In Step S55, the collision resolution value selection unit 260 determines that there is no estimation value output from the combination unit 240, and proceeds to Step S56. In Step S56, the collision resolution value selection unit 260 determines whether the number of matches of collected values, which include normal values (most frequent values) that are not empty, is greater than the allowable number of byzantine failures b4 or not. The collision resolution value selection unit 260 proceeds to Step S57 if there is a value with the number of matches greater than the allowable number of byzantine failures b4, and proceeds to Step S58 if not.

In Step S57, the collision resolution value selection unit 260 outputs the value with the matched number greater than the allowable number of byzantine failures b4 as an input to the PAXOS consensus unit 40 (collision resolution value), and ends the process.

In Step S61, where the number of matches of the combination empty value was deemed equal to or less than the allowable number of byzantine failures b4 in Step S54, the collision resolution value selection unit 260 determines whether the total number of collected values has reached the maximum value (n4−f4) or not.

If the total number of collected values has reached n4−f4, the collision resolution value selection unit 260 proceeds to Step S59, outputs "empty" (collision resolution value) to the PAXOS consensus unit 40, and ends the process.

If the total number of collected values has not reached n4−f4, the collision resolution value selection unit 260 proceeds to Step S62, collects additional outputs of the combination units 240 from the respective accelerators 16, and returns to Step S52 to repeat the process described above.

In Step S58, where the number of matches was deemed equal to or less than the allowable number of byzantine failures b4 in Step S56, the collision resolution value selection unit 260 determines whether the total number of collected values has reached the maximum value (n4−f4) or not.

If the total number of collected values has reached n4−f4, the collision resolution value selection unit 260 proceeds to Step S59, outputs "empty" to the PAXOS consensus unit 40, and ends the process.

If the total number of collected values has not reached n4−f4, the collision resolution value selection unit 260 proceeds to Step S60, collects additional outputs of the combination units 240 from the respective accelerators 16, and returns to Step S56 to repeat the process described above.

With the processes described above, the collision resolution value selection unit 260 determines what to be input to the PAXOS consensus unit 40 based on the output of the combination unit 240 and the output of the normal value selection unit 250, and outputs the determination result.

As described above, when the output of the combination unit 240 does not include a decision value, the collision resolution value selection unit 260 determines what to be input to the PAXOS consensus unit 40 (collision resolution value) based on the number of matches of the values collected by the collision resolution value selection unit 260.

<Most Frequent Value Selection Process>

Figure 14:
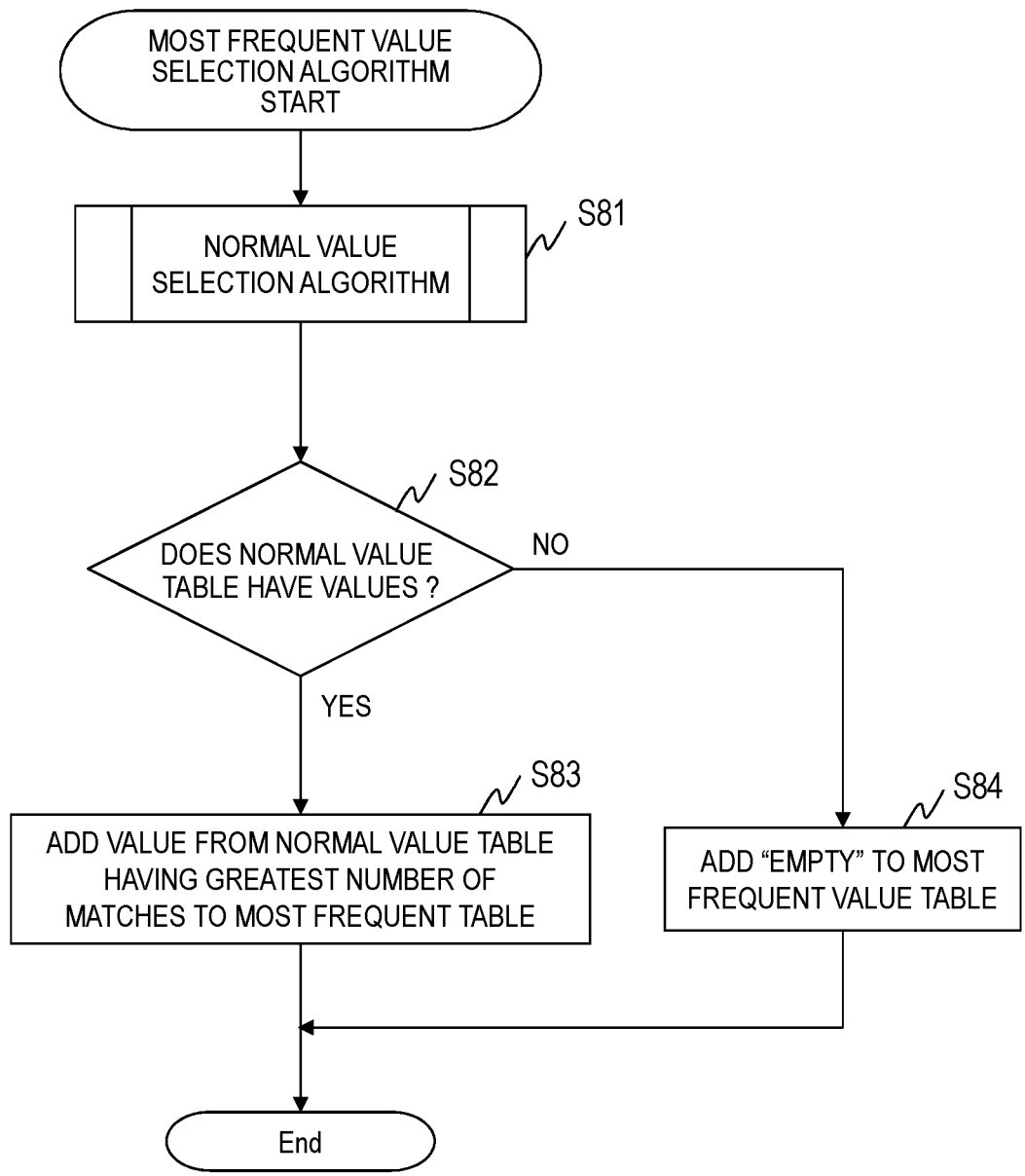
FIG. 14 is a flowchart illustrating an example of a process conducted by the normal value selection unit according to the first embodiment of this invention.

FIG. 14 is a flowchart illustrating an example of a process conducted by the normal value selection unit 250. This process is conducted in Step S9 of FIG. 8 when the most frequent value is used instead of the normal value. In a manner similar to the normal value selection process, the process sequence of the most frequent value selection process is not limited to this.

First, in Step S81, the normal value selection unit 250 conducts the normal value selection process illustrated in FIG. 13 to update the normal value table 330. In Step S 82, the normal value selection unit 250 determines whether or not a value exists in the normal value table 330. The normal value selection unit 250 proceeds to Step S83 if a value exists in the normal value table 330, or proceeds to Step S84 if a value does not exist.

In Step S83, the normal value selection unit 250 adds, to the most frequent value table 340, a value having the maximum number of matches out of the values in the normal value table 330. The number of matches here means the number of matches with the values received by the transmission and reception units 110 from the client 3 as illustrated in Step S71 of FIG. 13.

On the other hand, in Step S83, the normal value selection unit 250 adds an empty value to the most frequent value table 340.

With the processes described above, a value having the maximum number of matches out of the values received from the client by each transmission and reception unit 110 is added to the most frequent value table 340.

As described above, in the distributed processing system of Embodiment 1, even if a byzantine failure occurs in each unit of the accelerator 16, the process can be conducted with a low latency while preventing an abnormal value from being used or output and suppressing an increase in the number of processes (or the number of servers). Also, in Embodiment 1 of the present invention, even if a byzantine failure occurs, the process continues normally without detecting or correcting the byzantine failure, and the processing result can be returned to the client 3.

Embodiment 2

Figure 15:
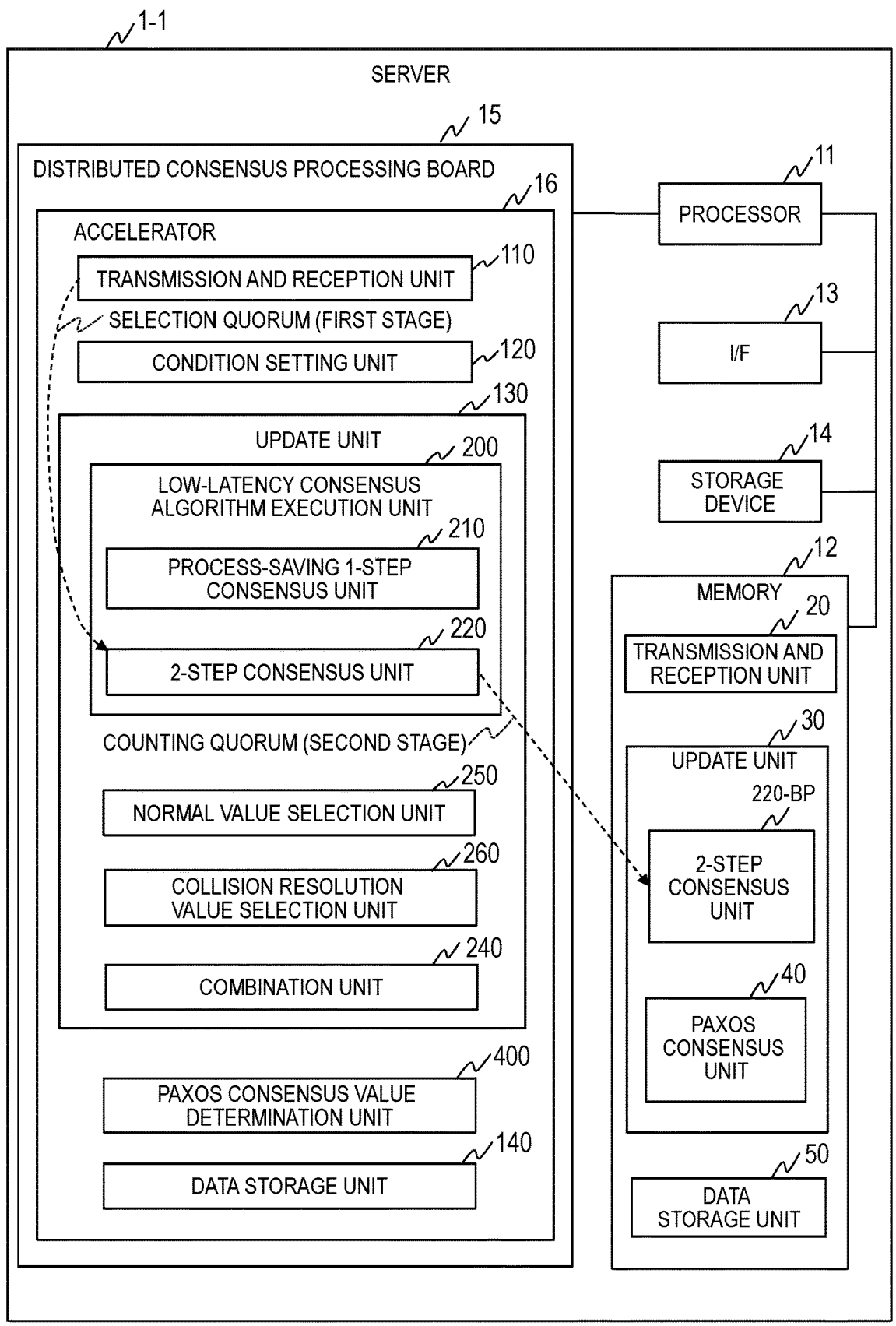
FIG. 15 is a block diagram illustrating an example of the configuration of the server according to a second embodiment of this invention.

FIG. 15 is a block diagram illustrating an example of the configuration of the server 1 of Embodiment 2. The server 1 of Embodiment 2 has the same configuration as that of Embodiment 1 except that the second stage part 220-B of the 2-step consensus unit 220 is replaced with a second stage part 220-BP of the 2-step consensus unit 220 of the memory 12 of the server 1, so that the process is conducted by a piece of hardware that differs from the accelerator 16.

In Embodiment 2, an example of running at least one of the functions of the accelerator 16 described in Embodiment 1 as software of the server 1 will be explained. That is, the second stage part 220-BP of the 2-step consensus unit 220 is loaded into the memory 12 of the server 1 as a program, and executed by the processor 11. By executing the 2-step consensus program, the processor 11 functions as the second stage part 220-B of the 2-step consensus unit 220.

In the 2-step consensus unit 220 of Embodiment 2, the first stage part 220-A that functions as the first stage part 220-A is processed by hardware of the accelerator 16, and the 2-step consensus unit (220-BP) that functions as the second stage part 220-B is processed by software of the server 1. That is, the first stage part 220-A and the second stage part 220-B are executed by different pieces of hardware.

By processing part of the 2-step consensus unit 220 by software of the server 1, byzantine failures such as FPGA soft error is very unlikely to occur, which makes it possible to ignore occurrence of byzantine failures in the selection quorum Q1 or counting quorum Q2, and as a result, it is possible to reduce the number of servers (the number of processes).

As explained in Embodiment 1 above, the required number of processes n2 for the 2-step consensus unit 220 is n2>max(2f21+b21, 2f22+2b22). Because the allowable number of failures f21 in the first stage part 220-A is 3, the allowable number of byzantine failures b21 in the first stage part 220-A is 1, the allowable number of failures f22 in the second stage part 220-B is 2, and the allowable number of byzantine failures b22 in the second stage part 220-B is 0, the minimum value of the number of processes n2 is 8.

In Embodiment 2, part of the 2-step consensus unit was implemented by software, but the entire 2-step consensus unit may be implemented by software.

As described above, part or all of the 2-step consensus unit 220 is realized by hardware (server 1) differing from the accelerator 16, and different parameters are used, thereby making it possible to reduce the required number of servers 1 for the 2-step consensus. In a manner similar to Embodiment 1, when the process-saving 1-step consensus unit 210 and the 2-step consensus unit 220 are combined, the number of processes n is defined by the following formula: n=max (2q+f1+2b1, 2f21+b21, 2f22+2b22), and when q=1, f1=f21=3, f22=2, b1=b21=1, and b22=0, n equals 8. Thus, even when the process-saving 1-step consensus unit 210 and the 2-step consensus unit 220 are combined, it is possible to reduce the required number of servers 1.

Embodiment 3

Figure 16:
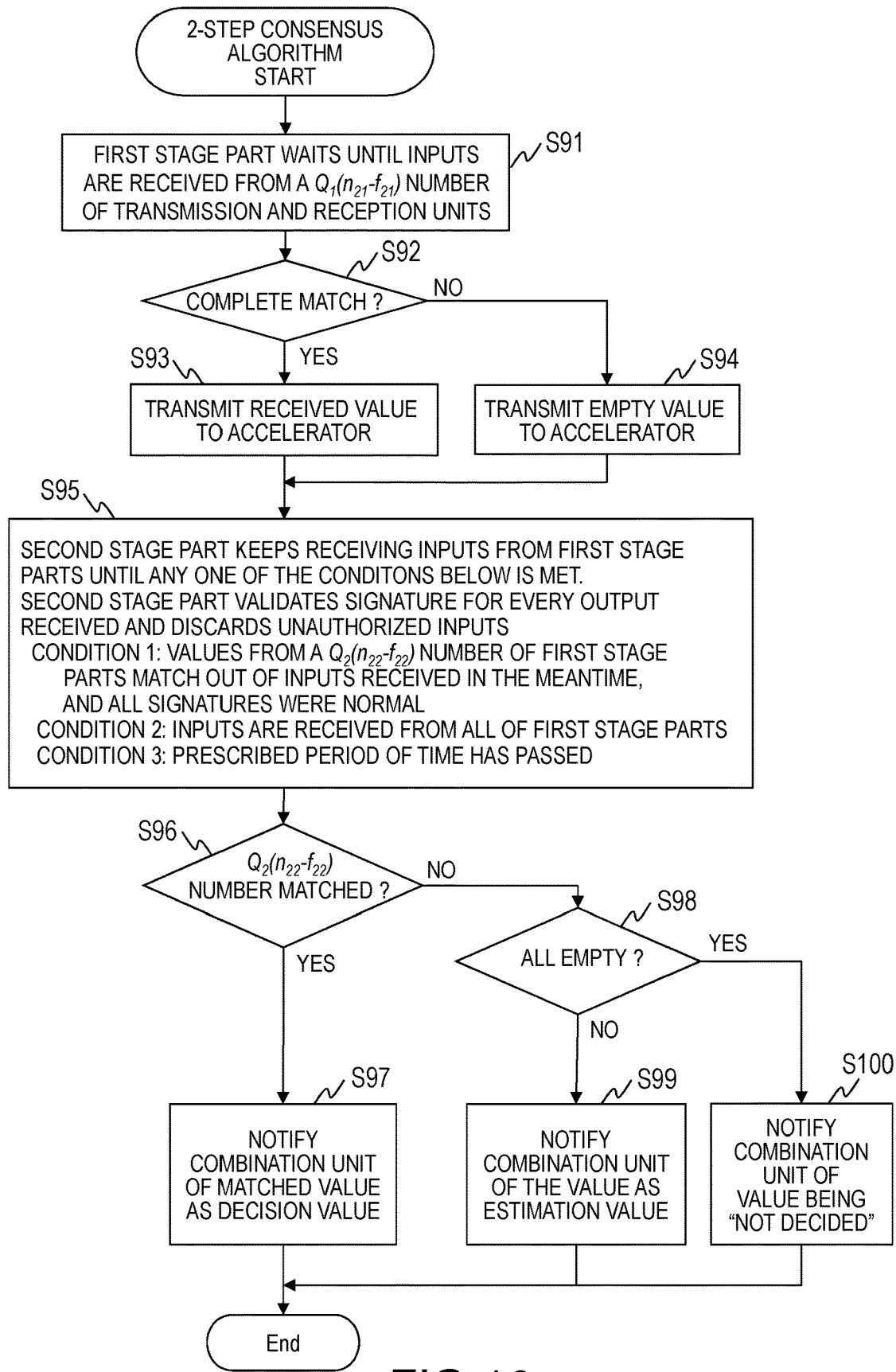
FIG. 16 is a flowchart illustrating an example of a process conducted by the 2-step consensus unit according to a third embodiment of this invention.

FIG. 16 illustrates Embodiment 3. Embodiment 3 describes an example in which the process request output from the client 3 includes a signature. The configurations of Embodiment 3 are the same as those of Embodiment 1 except that the process of the 2-step consensus unit 220 is partially modified.

FIG. 16 is a flowchart illustrating an example of a process conducted by the 2-step consensus unit 220. In the flowchart of FIG. 16, Steps S91 to S94 and S96 to S97 are the same as Steps S31 to S34 and S36 to S37 of Embodiment 1.

In Step S95, the second stage part 220-B of the 2-step consensus unit 220 validates the signature assigned to the process request (input) received from the first stage part 220-A, discards an input with invalid signature, and conducts a process on the input with valid signature, which differs from Embodiment 1 described above.

In Embodiment 3 where a signature is used, the condition of the number of processes (servers 1) n2 is represented as follows with the same variables as those of Embodiment 1: n2>max(2f21+b21, 2f22+b22).

When the allowable number of failures f21=f22=3, and the allowable number of byzantine failures b21=b22=1, the minimum value of the number of processes n2 is 8 in Embodiment 3 that uses signature. As a result, the total number of the servers 1 can be reduced as compared with Embodiment 1.

The signature used in Embodiment 3 is authentication information assigned by the client 3, to which a known technique such as the cryptographic hash function (Secure Hash Algorithm or the like) or an error detection code (CRC or the like) is applied.

Next, Steps S98 to S100 that differ from Steps S38 to S40 of FIG. 10 will be explained. In Step 98, the 2-step consensus unit 220 determines whether all of the values are empty or not. If so, the 2-step consensus unit 220 proceeds to Step S100, and if not, proceeds to Step S99.

In Step S99, a quorum comparison is not performed, and if there is a value that is not empty, the 2-step consensus unit 220 notifies the combination unit 240 of this value as the estimation value. On the other hand, in Step S100, because all of the values are empty, the 2-step consensus unit 220 notifies the combination unit 240 of the value being "not decided." In Steps S98 to S100, the 2-step consensus unit 220 discards invalid inputs and conducts the counting quorum with normal values only, which makes it unnecessary to determine the number of matches.

In Embodiment 3, the second stage part 220-B of the 2-step consensus unit 220 is configured to validate the signature. If an invalid signature is detected as a result of the validation, the value is discarded, and the determination process on the decision value or estimation value is conducted with valid signature data. When using the signature, the required number of servers can be reduced in the 2-step consensus unit 220. In a manner similar to Embodiment 1, when the process-saving 1-step consensus unit 210 and the 2-step consensus unit 220 are combined, the number of processes n is defined by the following formula: $n=\max(2q+f1+2b1, 2f21+b21, 2f22+b22)$, and when $q=1$, $f1=f21=f22=3$, $b1=b21=b22=1$, n equals 8. Thus, even when the process-saving 1-step consensus unit 210 and the 2-step consensus unit 220 are combined, it is possible to reduce the required number of servers 1.

Embodiment 4

Figure 20:
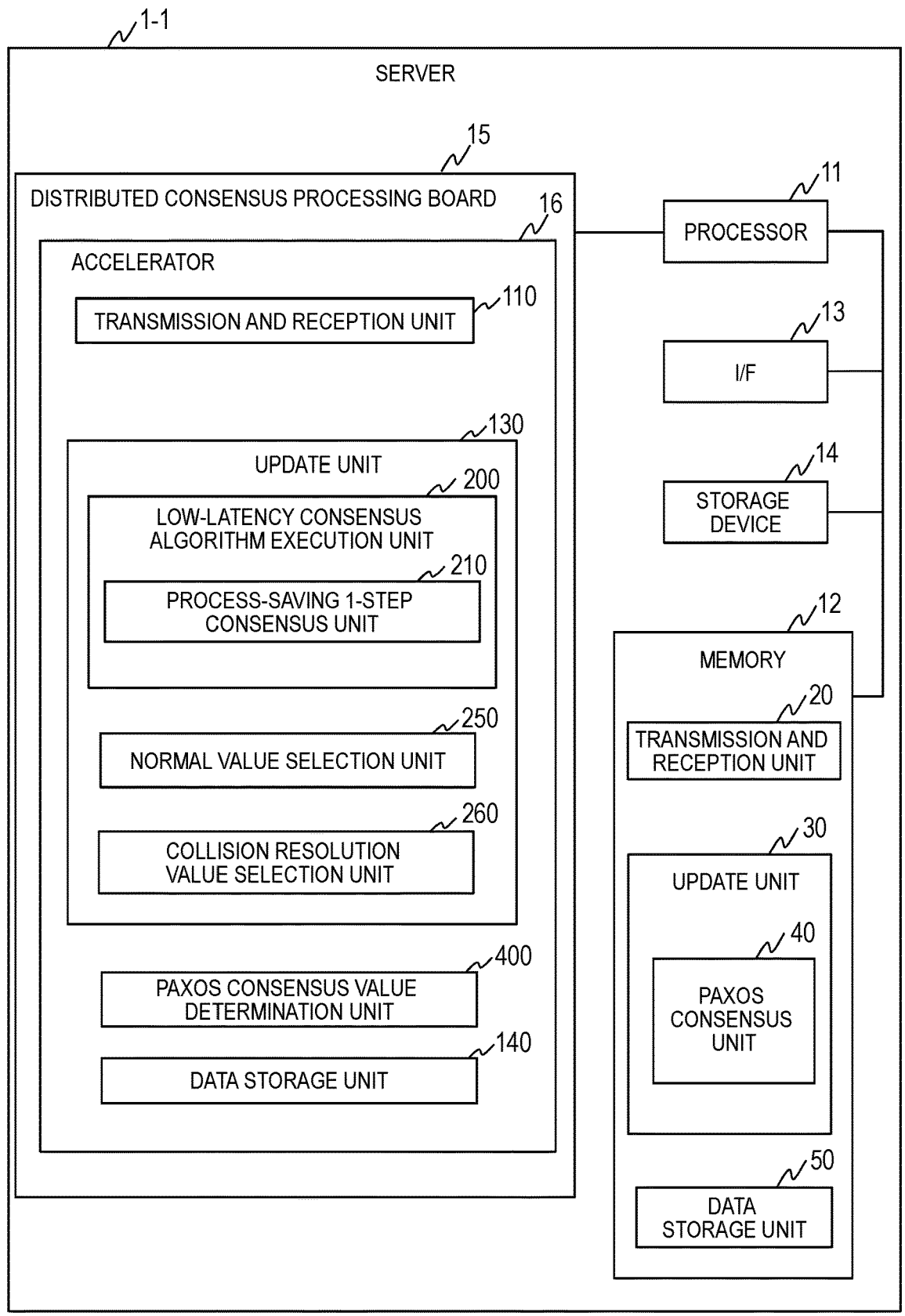
FIG. 20 is a block diagram illustrating an example of the configuration of the server according to a fourth embodiment of this invention.

FIG. 20 is a block diagram illustrating an example of the configuration of the server 1 of Embodiment 4. The server 1-1 of Embodiment 4 has the same configurations as that of Embodiment 1 except that the 2-step consensus unit 220, the combination unit 240, and the condition setting unit 120 are deleted from the processes conducted by the accelerator 16 of Embodiment 1.

In Embodiment 4, the outputs from the process-saving 1-step consensus unit 210 are input to the collision resolution value selection unit 260 so that a consensus is reached between other servers 1, and even if a byzantine failure occurs, it is possible to continue the processes normally without detecting or correcting the byzantine failure, while reducing the number of times of communications performed before the data consistency is guaranteed.

As described in Embodiment 1 above, the process-saving 1-step consensus unit 210 is configured such that the number of processes n1 satisfies $n1>2q+f1+2b1$, the decision quorum Qe satisfies $Qe=n1-q$, and the estimation quorum Qf satisfies $n1-f1 \geq Qf \geq 2q+2b1+1$. This way, even if a byzantine failure occurs in a b1 number of devices (servers 1), the process-saving 1-step consensus unit 210 can obtain the decision value and estimation value properly.

In Embodiment 4, if the decision value is obtained by the process-saving 1-step consensus unit 210, the minimum number of times of communications δ equals 2 as described in Embodiment 1.

In Embodiment 4, if a consensus is not reached by the process-saving 1-step consensus unit 210, a consensus can be reached by the PAXOS consensus unit 40.

As described above, according to Embodiment 4 of the present invention as well, even if a byzantine failure occurs, it is possible to continue a normal process without detecting or correcting such a failure, while suppressing an increase in the number of servers (process number) and reducing the number of times of communications before the data consistency is guaranteed. In addition, if FPGA is used for the accelerator 16, the accelerator 16 would have one less component that could have byzantine failures, and thus, the area of the logical resource for FPGA that realize each function unit can be reduced as compared with Embodiment 1 above. Thus, a byzantine failure is less likely to occur in the accelerator 16 as compared with Embodiment 1.

<Summary>

As described above, the distributed processing system of Embodiments 1 to 4 above is (1) a distributed processing method to receive data by a plurality of servers (1) each including a processor (11) and a memory (12), and process the data by replicating, the method including: a first determination step (210) in which the servers (1) each receive the replicated data, and the first determination unit (process-saving 1-step consensus unit 210) determines a degree of consistency of the received data; and an output step (output unit 450) in which the servers each receive a determination result of the degree of consistency of data from the first determination unit (210), and if the determination result includes data that guarantees consistency, outputs the data that guarantees consistency, wherein, in the first determination step (210), the first number of servers (n1) that are to receive the data is set in advance based on a prescribed allowable number of failures (q, f1) that defines the number of servers that can have failures, and an allowable number of byzantine failures (b1) that defines the number of servers that can have byzantine failures.

As a result, even if a byzantine failure occurs in each transmission and reception unit 110, it is possible to reduce the minimum number of times of communications until the server 1 reaches a consensus after the client 3 requests the server 1 to process data, while preventing an abnormal value from being used or output. Furthermore, even if a byzantine failure occurs, the server 1 can continue the process normally without detecting or correcting the byzantine failure, and return the processing result to the client 3.

(2). The distributed processing method according to (1), further including: a second determination step (220) in which the servers (1) each determine a degree of consistency of the received data in a second determination unit (2-step consensus unit 220) that has a minimum number of times of server-to-server communications (δ) greater than that of the first determination unit (210); and a combination step (combination unit 240) in which the servers (1) each receive a determination result of the degree of consistency of the data from the first determination unit (210) and the second determination unit (220), and the determination result of the first determination unit (210) and the determination result of the second determination unit (220) are combined, wherein, in the second determination step (220), the second number of servers n2 that are to receive the data is set in advance based on the allowable number of failures f2 and the allowable number of byzantine failures b2 and wherein, in the output step (450), if the combination of the determination results includes the data that guarantees consistency, the data that guarantees consistency is output.

By combining the process-saving 1-step consensus unit 210 and the 2-step consensus unit 220, even if a byzantine failure occurs in each processing unit, it is possible to reduce the minimum number of times of communications, while preventing an abnormal value from being used or output and suppressing an increase in the number of processes (or number of servers).

(3). The distributed processing method according to (2), further including: a collision resolution value selection step (collision resolution value selection unit 260) in which, the servers (1) each select a collision resolution value to reach a consensus with other servers, when the determination result of the combination step (240) does not include the data that guarantees consistency; and a consensus step (PAXOS consensus unit 40) in which the servers (1) each reach a consensus in terms of the consistency of the collision resolution value using a prescribed consensus algorithm (PAXOS algorithm), wherein, in the output step (450), if a result of the consensus includes the data that guarantees consistency, the data that guarantees consistency is output.

When a number of requests (a number of pieces of data) collide with each other and there are only a small number of pieces of data that match, the combination unit 240 cannot obtain the decision value and estimation value, and thus outputs an arbitrary value. By selecting a normal value in this process, it is possible to prevent an abnormal value from being selected.

(4). The distributed processing method according to (2), wherein the second number of servers (n2) is determined by a third number of servers (n21) and a fourth number of servers (n22), wherein the second determination step (220) includes: a first stage step (first stage part 220-A) of receiving data from the servers (selection quorum Q1) of a predetermined third number of servers (n21), and determining whether the data matches; and a second stage step of receiving a determination result of the first stage step (220-A) from the servers (counting quorum Q2) of a predetermined fourth number of servers (n22) and determining whether the data partially matches, and wherein at least one of the first stage step (220-A) and the second stage step (220-B) is conducted on a different piece of hardware.

All or part of the process of the consensus (first stage part 220-A and second stage part 220-B) of the 2-step consensus unit 220 is implemented by hardware or software that does not cause a soft error. This makes it possible to ignore occurrence of byzantine failures in the selection quorum Q1 or counting quorum Q2 of the 2-step consensus unit 220, which allows for a reduction in the number of servers (number of processes) of the entire computer system.

(5). The distributed processing method according to (2), wherein the second number of servers (n2) is determined by the third number of servers (n21) and the fourth number of servers (n22), wherein the second determination step (220) includes: a first stage step (220-A) of receiving data from the servers (Q1) of a predetermined third number of servers (n21), and determining whether the data matches; and a second stage step (220-B) of receiving a determination result of the first stage step (220-A) from the servers (Q2) of a predetermined fourth number of servers (n22) and determining whether a piece of data in the received data meets a prescribed condition, and wherein the data includes authorization information (signature), and in the second stage step (220-B), the determination is conducted on the data that was successfully validated based on the authorization information (signature).

The second stage part 220-B of the 2-step consensus unit 220 validates the signature, and determines the decision value or estimation value using the data with valid signature. When using the signature, the required number of servers can be reduced in the 2-step consensus unit 220.

(6). The distributed processing method according to (2), wherein the first number of servers n1 is greater than 2q+f1+2b1, where the first allowable number of failures out of the allowable numbers of failures is q (allowable number of failures that can maintain the minimum latency), the second allowable number of failures is f1, and the allowable number of byzantine failures is b1.

When the consensus process is conducted by the process-saving 1-step consensus unit 210, the 2-step consensus unit 220, the combination unit 240, the normal value selection unit 250, and the collision resolution value selection unit 260, if the number of processes satisfies n1 above, it is possible to reduce the number of servers 1 and minimize the number of times of communications $\delta$.

(7). The distributed processing method according to (6), wherein the first number of servers n1 is the minimum value of the number of servers that conduct the distributed processing.

(8). The distributed processing method according to (3), further comprising: a normal value information storing step (S9) of storing the number of matches of the received data and a value of the data in normal value information (normal value table 330) as a normal value; and a normal value output step of (S10) obtaining a normal value corresponding to the data from the normal value information (330) and outputting the normal value, if the determination result of the combination step (combination unit 240) does not include an estimation value, wherein, in the collision resolution value selection step (260), the collision resolution value is selected using the normal value.

When there are only a small number of pieces of data that match, the combination unit 240 cannot obtain the decision value and estimation value, and thus outputs an arbitrary value. By selecting a normal value in this process, it is possible to prevent an abnormal value from being selected.

(9). The distributed processing method according to (8), wherein, in the normal value information storing step (S9), a piece of data from the normal value information (330) that has the greatest number of matches is stored in most frequent value information (most frequent value table 340) as a most frequent value, and wherein, in the normal value output step (S10), the most frequent value corresponding to the data is obtained from the most frequent value information (340) and output, if the determination result does not include an estimation value.

When there are only a small number of pieces of data that match, the combination unit 240 cannot obtain the decision value and estimation value, and thus outputs an arbitrary value. By selecting the most frequent value in this process, it is possible to prevent an abnormal value from being selected.

(10). The distributed processing method according to (2), wherein, if the first determination unit (210) or the second determination unit (220) determines that all pieces of received data match, and the number of times of communications is likely to be reduced, additional data is received from other servers (1).

This makes it possible to reduce the latency in the process-saving 1-step consensus unit 210, and the 2-step consensus unit 220 that uses the quorum comparison, or the 2-step consensus unit 220 that uses signatures.

In the process-saving 1-step consensus unit 210, until either one of the following conditions is met, additional data is received from other servers 1: (Condition 1) values received from a Qe(n1−q) number of transmission and reception units 110 match, out of the received inputs; (Condition 2) data has been received from all of the transmission and reception units 110 (other servers 1); or (Condition 3) a prescribed period of time has passed. In the 2-step consensus unit 220, until either one of the following conditions is met, additional data is received from other servers 1: (Condition 4) values received from a Q2 (n22−f22) number of first stage parts 220-A match, out of the received inputs; (Condition 5) data has been received from the first stage parts 220-A of all accelerators 16 (other servers 1); or (Condition 6) a prescribed period of time has passed.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some or all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A distributed processing method to receive data by a plurality of servers each including a processor and a memory, and process the data by replicating, the method comprising:
    a first determination step in which the servers each receive the replicated data, and a first determination unit determines a degree of consistency of the received data; and
    an output step in which the servers each receive a determination result of the degree of consistency of the data from the first determination unit, and if the determination result includes data that guarantees consistency, the server outputs the data that guarantees consistency,
    wherein, in the first determination step, a first number of servers that are to receive the data is set in advance based on a prescribed allowable number of failures that defines the number of servers that can have failures, and an allowable number of byzantine failures that defines the number of servers that can have byzantine failures;
    a second determination step in which the servers each determine a degree of consistency of the received data in a second determination unit that has a minimum number of times of server-to-server communications greater than that of the first determination unit for determining the degree of consistency of the data; and
    a combination step in which the servers each receive a determination result of the degree of consistency of the data from the first determination unit and the second determination unit, and the determination result of the first determination unit and the determination result of the second determination unit are combined,
    wherein, in the second determination step, a second number of servers that are to receive the data is set in advance based on the allowable number of failures and the allowable number of byzantine failures,
    wherein, in the output step, if the combination of the determination results includes the data that guarantees consistency, the data that guarantees consistency is output, and
    wherein the first number of servers n is greater than $2q+f+2b$, where a first allowable number of failures out of the allowable number of failures is q, a second allowable number of failures out of the allowable number of failures is f, and the allowable number of byzantine failures is b.

2. The distributed processing method according to claim 1, further comprising: a collision resolution value selection step in which the servers each select a collision resolution value to reach a consensus with other servers, when the determination result of the combination step does not include the data that guarantees consistency; and
    a consensus step in which the servers each reach a consensus in terms of the consistency of the collision resolution value using a prescribed consensus algorithm,
    wherein, in the output step, if a result of the consensus includes the data that guarantees consistency, the data that guarantees consistency is output.

3. The distributed processing method according to claim 2, further comprising: a normal value information storing step of storing the number of matches of the received data and a value of the data in normal value information as a normal value; and
    a normal value output step of obtaining a normal value corresponding to the data from the normal value information and outputting the normal value, if the determination result of the combination step does not include an estimation value,
    wherein, in the collision resolution value selection step, the collision resolution value is selected using the normal value.

4. The distributed processing method according to claim 3, wherein, in the normal value information storing step, a piece of data from the normal value information that has the greatest number of matches is stored in most frequent value information as a most frequent value, and
    wherein, in the normal value output step, the most frequent value corresponding to the data is obtained and output from the most frequent value information, if the determination result does not include an estimation value.

5. The distributed processing method according to claim 1, wherein the second number of servers is determined by a third number of servers and a fourth number of servers,
    wherein the second determination step includes:
    a first stage step of receiving data from the servers of a predetermined third number of servers, and determining whether the data matches; and a second stage step of receiving a determination result of the first stage step from the servers of a predetermined fourth number of servers and determining whether the data partially matches, and wherein at least one of the first stage step and the second stage step is conducted on a different piece of hardware.

6. The distributed processing method according to claim 1, wherein the second number of servers is determined by a third number of servers and a fourth number of servers, wherein the second determination step includes:

a first stage step of receiving data from the servers of a prescribed third number of servers, and determining whether the data matches; and a second stage step of receiving a determination result of the first stage step from the servers of a prescribed fourth number of servers and determining whether a piece of data in the received data meets a prescribed condition, wherein the data includes authentication information, and wherein, in the second stage step, the determination is conducted on data that was successfully validated based on the authentication information.

7. The distributed processing method according to claim 1, wherein the first number of servers n is a minimum value of the number of servers that conduct distributed processing.

8. The distributed processing method according to claim 1, wherein, if the first determination unit or the second determination unit determines that all pieces of received data match, and the number of times of communications is likely to be reduced, additional data is received from other servers.

9. A distributed processing system to receive data by a plurality of servers each including a processor and a memory, and process the data by replicating, wherein each of the servers further comprises:

a first determination unit configured to determine a degree of consistency between the replicated data; and an output unit configured to receive a determination result of the consistency of data from the first determination unit, and if the determination result includes the data that guarantees consistency, outputs the data that guarantees consistency, wherein, in the first determination unit, a first number of servers that are to receive the data is set in advance based on a prescribed allowable number of failures that defines the number of servers that can have a failure, and an allowable number of byzantine failures that defines the number of servers that can have byzantine failures;

a second determination unit configured to have a minimum number of times of server-to-server communications greater than that of the first determination unit in determining a degree of consistency of the replicated data; and a combination unit configured to receive a determination result of the consistency of data from the first determination unit or the second determination unit, and combine the determination result of the first determination unit and the determination result of the second determination unit, wherein, in the second determination unit, a second number of servers that are to receive the data is set in advance based on the allowable number of failures and the allowable number of byzantine failures, and wherein, if the combination of the determination results includes the data that guarantees consistency, the output unit outputs the data that guarantees consistency wherein the first number of servers n is greater than $2q+f+2b$, where a first allowable number of failures out of the allowable number of failures is $q$, a second allowable number of failures out of the allowable number of failures is $f$, and the allowable number of byzantine failures is $b$.

10. The distributed processing system according to claim 9, wherein each of the servers further comprises:

a collision resolution value selection unit configured to select a collision resolution value to reach a consensus with other servers if the determination result does not include the data that guarantees consistency; and a consensus unit configured to reach a consensus in terms of the consistency of the collision resolution value using a prescribed consensus algorithm, wherein, if a result of the consensus includes the data that guarantees consistency, the output unit outputs the data that guarantees consistency.

11. The distributed processing system according to claim 10, further comprising: a normal value information storage unit configured to store the number of matches of the received data and a value of the data in normal value information as a normal value; and a normal value output unit configured to obtain a normal value corresponding to the data from the normal value information and output the normal value, if the determination result of the combination unit does not include an estimation value, wherein the collision resolution value selection unit is configured to select the collision resolution value using the normal value.

12. The distributed processing system according to claim 11, wherein the normal value information storage unit stores a piece of data from the normal value information that has the greatest number of matches in most frequent value information as a most frequent value, and wherein the normal value output unit obtains the most frequent value corresponding to the data from the most frequent value information and outputs the most frequent value, if the determination result does not include an estimation value.

13. The distributed processing system according to claim 9, wherein the second number of servers is determined by a third number of servers and a fourth number of servers, wherein the second determination unit includes:

a first stage part configured to receive data from the servers of a predetermined third number of servers, and determine whether the data matches; and a second stage part configured to receive a determination result of the first stage part from the servers of a predetermined fourth number of servers and determine whether the data partially matches, and wherein at least one of the first stage part and the second stage part functions on a different piece of hardware.

14. The distributed processing system according to claim 9, wherein the second number of servers is determined by a third number of servers and a fourth number of servers, wherein the second determination unit includes:

a first stage part configured to receive data from the servers of a predetermined third number of servers, and determine whether the data matches; and a second stage part configured to receive a determination result of the first stage part from the servers of a predetermined fourth number of servers and determine whether a piece of data in the received data meets a prescribed condition, wherein the data includes authentication information, and wherein the second stage part conducts the determination on data that was successfully validated based on the authentication information.

15. The distributed processing system according to claim 9, wherein the first number of servers n is a minimum value of the number of servers that conduct distributed processing.

16. The distributed processing system according to claim 9, wherein, if the first determination unit or the second determination unit determines that all pieces of received data match, and the number of times of communications is likely to be reduced, additional data is received from other servers.

* * * * *